United States Patent
Desoutter et al.

(10) Patent No.: US 10,500,782 B2
(45) Date of Patent: Dec. 10, 2019

(54) ROTARY MACHINE COMPRISING FIRST STATIONS AND SECOND STATIONS ROTATING AROUND A SINGLE MAIN AXIS

(71) Applicant: DISCMA AG, Zürich (CH)

(72) Inventors: Luc Desoutter, Octeville sur Mer (FR); Emmanuel Grassin D'Alphonse, Octeville sur Mer (FR); Mart Tiismann, Octeville sur Mer (FR)

(*) Notice: Subject to any disclaimer, the term of this patent is extended or adjusted under 35 U.S.C. 154(b) by 346 days.

(21) Appl. No.: 15/310,692

(22) PCT Filed: May 13, 2015

(86) PCT No.: PCT/EP2015/060697
§ 371 (c)(1),
(2) Date: Nov. 11, 2016

(87) PCT Pub. No.: WO2015/173358
PCT Pub. Date: Nov. 19, 2015

(65) Prior Publication Data
US 2017/0072618 A1 Mar. 16, 2017

(30) Foreign Application Priority Data
May 13, 2014 (EP) .................................. 14305702

(51) Int. Cl.
*B29C 49/36* (2006.01)
*B29C 49/42* (2006.01)
(Continued)

(52) U.S. Cl.
CPC ............ *B29C 49/36* (2013.01); *B29C 49/421* (2013.01); *B29C 49/46* (2013.01); *B67C 3/242* (2013.01);
(Continued)

(58) Field of Classification Search
CPC ... B67C 3/242; B67C 2003/227; B67C 7/004; B29C 49/36; B29C 49/4205;
(Continued)

(56) References Cited

U.S. PATENT DOCUMENTS 4,456,040 A * 6/1984 Bacroix et al. ......... B67C 7/004
141/150
5,702,734 A * 12/1997 Hartman et al. .... B29C 49/6427
264/237

(Continued)

FOREIGN PATENT DOCUMENTS

JP H0740955 A 2/1995
WO 2013020885 A1 2/2013

*Primary Examiner* — Stephen F. Gerrity
(74) *Attorney, Agent, or Firm* — Eric J. Sosenko; Jonathan P. O'Brien; Honigman LLP

(57) ABSTRACT

A rotary machine includes a main axis, a plurality of first stations and a plurality of second stations. Each first station rotates around the main axis and applies a first process to a container. Each second station rotates around the main axis and applies a second process to a processed container. The machine also includes an internal exit position, at which each first station is located once the first station has completed the first process and that is arranged to release the processed container. At an internal entry position, each second station is arranged to receive the released processed container. At least one transfer arm is adapted to seize a processed container and move the processed container between a first station located at the internal exit position and a second station located at the internal entry position.

15 Claims, 20 Drawing Sheets

(51) Int. Cl.
  *B29C 49/46* (2006.01)
  *B67C 3/24* (2006.01)
  *B67C 7/00* (2006.01)
  *B29C 49/06* (2006.01)
  *B29L 31/00* (2006.01)
  *B67C 3/22* (2006.01)

(52) U.S. Cl.
  CPC .............. *B67C 7/004* (2013.01); *B29C 49/06* (2013.01); *B29C 49/4205* (2013.01); *B29C 2049/465* (2013.01); *B29C 2049/4664* (2013.01); *B29L 2031/712* (2013.01); *B67C 2003/227* (2013.01)

(58) Field of Classification Search
  CPC .............. B29C 49/421; B29C 49/4215; B29C 49/4252; B29C 49/4273; B29C 2049/4664
  USPC ........... 53/559, 561, 278–280, 282; 425/524, 425/534, 540
  See application file for complete search history.

(56) References Cited

U.S. PATENT DOCUMENTS

| | | | |
|---|---|---|---|
| 6,152,723 A | 11/2000 | Winter et al. | |
| 7,396,225 B2* | 7/2008 | Hansen | B65B 3/022 425/524 |
| 8,999,223 B2 | 4/2015 | Voth | |
| 9,321,229 B2* | 4/2016 | Winzinger | B67C 7/004 |
| 2009/0127076 A1* | 5/2009 | Balboni et al. | B29C 49/36 198/803.3 |
| 2011/0132892 A1* | 6/2011 | Winzinger et al. | B29C 49/4205 219/420 |
| 2012/0100241 A1* | 4/2012 | Parrinello et al. | B29C 43/36 425/525 |
| 2013/0037997 A1* | 2/2013 | Voth | B29C 49/36 264/523 |
| 2014/0298100 A1* | 10/2014 | Grimm | B67C 3/007 714/37 |
| 2015/0328821 A1* | 11/2015 | Chauvin et al. | B29C 49/36 264/39 |
| 2016/0271858 A1* | 9/2016 | Diesnis | B65B 3/022 |

* cited by examiner

ROTARY MACHINE COMPRISING FIRST STATIONS AND SECOND STATIONS ROTATING AROUND A SINGLE MAIN AXIS

CROSS-REFERENCE TO RELATED APPLICATIONS

This application is the U.S. national phase of International Application No. PCT/EP2015/060697 filed on May 13, 2015 and claims priority to European Application No. 14305702.4 filed on May 13, 2014, the disclosures of which are incorporated in their entirety by reference herein.

TECHNICAL FIELD OF THE INVENTION

The present invention relates to a rotary machine for processing containers. In particular, the invention relates to a rotary machine for forming and filling containers by injecting a liquid inside successive preforms placed in successive molds. In a particular embodiment, the invention relates to the field, known as hydro forming, of forming containers from a preform using an incompressible liquid to deform the preform.

In the application, "liquid" has a physical meaning. It designates any incompressible and able to flow medium. The liquid can have a low viscosity (like water or alcohol), a medium viscosity (like eatable oil or soup), or a high viscosity (like yoghurt or creamy product). The liquid can be homogeneous or not homogeneous (including fruit pulp or bits of foodstuff). It is not limited to foodstuff. The incompressible liquid may be for example water, or other beverages, body care products, home and garden care products, medical fluids, fuels, operating fluids, and the like.

BACKGROUND

It is known to process containers using rotary machines arranged to move the containers to be processed in rotation on wheels while performing one or more processes on the containers.

When the containers have to be subjected to more than one process, the rotary machine for example comprises successive wheels moving in rotation along parallel axes, each carrying stations arranged to perform one of the processes. The containers are moved through the machine, from one wheel to the next, and are each received in one station of each wheel where they are subjected to one process while they move in rotation on each wheel. Such machines offer a satisfactory throughput of processed containers since the processes are carried out in parallel, one wheel performing one process on a set of containers while another wheel preforms another process on another set of containers. The processes are therefore performed in parallel on different sets of containers.

However, such machines are very space consuming since the wheels have to be arranged one next to the other. Furthermore, when one of the processes is a filling process during which the containers are filled with a liquid, chances are high that liquid is spilled out of the containers under the influence of the centrifugal forces applied on the containers while they move in rotation or when their direction of rotation changes when they move from one wheel to the next.

In order to solve this problem, the containers have to be closed, for example by a cap, as soon as possible after they have been filled.

In order to do so, it has been proposed, as described in FIG. 2A of WO2013/020885, to perform the filling of the containers and the closing of said containers on the same wheel. In this case, the containers are subjected to a filling process in a first part of the rotational path of the wheel and are subjected to a closing process in the second part of the rotational path of the wheel. Consequently, the closing occurs immediately after the filling and the risks of spilling are reduced. However, the stations used for performing the filling process cannot be used at the same time for the closing process and conversely the stations used for performing the closing cannot be used at the same time for performing the filling process. The processes are consequently performed sequentially rather than in parallel. The number of stations performing the filling process and the number of stations performing the closing process are therefore reduced and the throughput of the machine decreases.

The same drawbacks remain for other processes than filling and closing containers. For example, filling containers should occur immediately after decontaminating said containers.

Document U.S. Pat. No. 6,152,723 discloses a rotary machine for first heating preforms and then blowing the preforms into containers. These processes are performed in parallel by rotating the preforms around a main axis in first stations arranged to heat the preforms, by moving the preforms from the first stations to second stations and by rotating them around the main axis in the second stations arranged to blow the preforms into containers. In the first stations, the preforms are moved in an upside down configuration, i.e. with their open end turned downwards. The preforms are moved to the second stations in this configuration or are turned between the upside down configuration and an upward configuration during the transfer to the second stations.

Document DE-10 2010 002246 discloses a rotary machine for first blowing preforms into containers and then labelling the blown containers. These processes are performed in parallel by rotating the preforms around a main axis in first stations arranged to blow the preforms into containers, by moving the formed containers from the first stations to second stations and by rotating them around the main axis in the second stations arranged to label the containers.

In these rotary machines, the processed containers, i.e. the heated preforms in U.S. Pat. No. 6,152,723 and the blown containers in DE-10 2010 002246, are moved to the second stations while they are empty. Consequently, the transfer of the processed containers between the first and second stations is not particularly problematic but would not be adapted if the processed containers were filled with a liquid.

One of the aims of the invention is to overcome the drawbacks mentioned above, by proposing a machine for processing containers, wherein several processes can be performed in parallel while reducing the space requirement of the machine and while preventing any spilling of the content of the containers during the transfer of the containers between first stations, wherein the containers are filled with a liquid, and second station, wherein the containers are subjected to another process.

SUMMARY OF THE INVENTION

To this end, the invention relates to a machine for forming and filling containers comprising:
a main axis, a plurality of first stations, each first station being arranged for applying a first process to a container, each first station rotating around the main axis, wherein the first process comprises a filling process during which a container is filled with liquid, a plurality of second stations, each second station being arranged for applying a second process to a processed container already processed by the first process, each second station rotating around the main axis, an internal exit position, at which each first station is located once said first station has completed the first process to a container and is arranged to release the processed container, an internal entry position, at which each second station is arranged to receive a processed container and to start applying the second process to said processed container, at least one transfer arm comprising a gripper element adapted to seize a processed container, said gripper element being movable between a first station located at the internal exit position and a second station located at the internal entry position.

By rotating the first stations and the second stations around the same main axis, for example by arranging the second stations above or under the first stations for a vertical main axis, it is possible to perform the first process and the second process in parallel, all the first stations being dedicated to perform the first process, wherein the containers are filled with liquid, and all the second stations being dedicated to perform the second process, the first and second processes being performed at the same time on different sets of containers. Consequently, the throughput of the machine is satisfactory. Furthermore, the space requirement of the machine is reduced, since there is no need to provide successive wheels for receiving the first stations and the second stations. Furthermore, the transfer arm has to be arranged to prevent any spilling of the liquid outside the processed containers during their transfer from the internal exit position to the internal entry position.

According to other features of the machine according to the invention:

the rotary machine comprises a plurality of subassemblies, each subassembly comprising a first station and a corresponding second station, such that the machine comprises an equal number of first stations and of second stations, said first stations and said second stations rotating around the main axis at the same speed, the transfer arm being arranged to seize a processed container from a first station of a subassembly and to transfer the processed container to the corresponding second station of said subassembly;

each subassembly comprises a transfer arm rotating around the main axis arranged to transfer the processed container from the first station of said subassembly located at the internal exit position to the corresponding second station of said subassembly located at the internal entry position.

By having the same number of first stations and of second stations, rotating at the same speed, it is possible to attach the first stations and the second stations to a single wheel rotating around the main axis, thus greatly simplifying the mechanical structure of the machine and means needed to rotate the first and second stations. Furthermore, each transfer arm for transferring a processed container from a first station to a second station may require only two degrees of liberty, as will be described subsequently.

According to other features of the machine according to the invention:

the rotary machine comprises a first number (N1) of first stations and a second number of second stations, the first number being different from the second number, the first stations rotating around the main axis at a first rotation speed and the second stations rotating around the main axis at a second rotation speed, wherein the first speed and the second speed are such that:

$$\frac{W2}{W1} = \frac{N1}{N2}$$

the first stations are provided on a first wheel and the second stations are provided on a second wheel, the first wheel and the second wheel rotating around the same main axis, the machine comprising a single transfer arm arranged to move the processed container from a first station at the internal exit position on the first wheel to a second station at the internal entry position on the second wheel.

According to this embodiment, it is possible to have more second stations than first stations, which can be advantageous when the second stations require less space than the first stations or when the time required for the two processes are very different. In this embodiment, a single transfer arm is required.

According to another feature of the machine according to the invention, the rotary machine comprises an external entry position at which the successive containers to be filled are each fed into a first station, and wherein each of the first stations comprises a filling device extending along a first station axis.

According to another feature of the machine according to the invention, the first station axis is tilted with respect to the main axis at least when the corresponding first station is at the internal exit position.

By tilting the first station axis, the effects of the centrifugal force imparted on the containers during filling are limited, which reduces the risks of spilling liquid out of the filled containers.

According to other features of the machine according to the invention:

the first process comprises a filling and forming process during which a preform is shaped and filled with a liquid into a processed container, the rotary machine comprising an external entry position, at which successive preforms are fed to successive first stations, wherein each first station comprises at least:

a mold defining a mold cavity having the shape of the processed container to be obtained at the end of the first process, said mold being arranged to receive a preform when the first station is located at the external entry position of the rotary machine and being arranged to release the processed container at the internal exit position, a filling device connectable in a liquid tight manner to a neck of the preform received by the mold or of a processed container, the filling device being arranged to inject a liquid into the preform received by the mold such that the liquid shapes the preform into the processed container and fills the processed container;

the mold and the filling device extend along a first station axis, which is tilted with respect to the main axis at least at the internal exit position, said first station axis forming an angle with main axis and being arranged to prevent liquid from being spilled out of the processed container once the filling device is disconnected from the neck of the processed container;

the preforms extend along an axis substantially parallel to the main axis at the external entry position of the rotary machine and wherein each mold is movable between a straight position, wherein the mold extends along an axis parallel to the main axis, and a tilted position, wherein the mold extends along the first station axis, said mold being placed in the straight position at the external entry position of the machine to receive a preform and being moved, along with the received preform, to the tilted position at the start of the first process;

the preforms extend along an axis substantially parallel to the main axis at the external entry position of the rotary machine and wherein the machine further comprises a tilting arm arranged to move a preform to the mold of a first station located at the external entry position of the machine, said tilting arm being arranged to tilt the preform to align the axis of said preform with the tilted first station axis of the mold and to place the tilted preform in the mold.

The invention therefore offers various embodiments and solutions for limiting the effects of the centrifugal force imparted on the containers during filling and to align a preform with the first station axis at the external entry position.

According to another feature of the invention, the preforms extend along an axis substantially parallel to the main axis at the external entry position of the rotary machine and wherein the machine further comprises a tilting arm arranged to move a preform to the mold of a first station located at the external entry position of the machine, said tilting arm being arranged to tilt the preform to align the axis of said preform with the tilted first station axis of the mold and to place the tilted preform in the mold.

As mentioned previously, the machine is particularly adapted for performing a capping process as soon as possible after a filling process, thereby limiting the risks of spilling.

According to other features of the machine according to the invention:

the opening of the container seat and the capping device extend along a second station axis, parallel to the first station axis, such that the processed container extends along the second station axis at least when said second station is at the internal entry position;

the gripper element is arranged to maintain the processed container aligned on an axis parallel to the first station axis and to the second station axis between the internal exit position and the internal entry position, and/or the rotary machine further comprises an external exit position at which each second stations are arranged to release the capped container.

The machine can be arranged to maintain a processed container tilted during the transfer of the processes container from a first station to a second station, which greatly reduces the risks of spilling under the influence of centrifugal forces applied on the containers while they are not closed.

According to other features of the machine according to the invention:

the internal exit position and the internal entry position are offset relative to each other according to the main axis and the transfer arm is at least movable in translation according to an axis parallel to the main axis and/or wherein the internal exit position and the internal entry position are offset relative to each other according to a radial axis substantially perpendicular to the main axis, the transfer arm being at least movable in translation according to an axis parallel to the radial axis;

the internal exit position and the internal entry position are furthermore angularly offset relative to each other, the transfer arm being further movable in rotation around a transfer axis parallel to and remote from the main axis.

Depending on the embodiment of the invention, the degrees of liberty of the transfer arm or of each of the transfer arms are adapted to ensure a proper transfer of a processed container from a first station to a second station.

The invention also relates to a machine for forming and filling containers comprising:

a main axis, a plurality of first stations, each first station being arranged for applying a first process to a container, each first station rotating around the main axis, wherein the first process comprises injecting a content into a container, a plurality of second stations, each second station being arranged for applying a second process to a processed container already processed by the first process, each second station rotating around the main axis, an internal exit position, at which each first station is located once said first station has completed the first process to a container and is arranged to release the processed container, an internal entry position, at which each second station is arranged to receive a processed container and to start applying the second process to said processed container, at least one transfer arm comprising a gripper element adapted to seize a processed container, said gripper element being movable between a first station located at the internal exit position and a second station located at the internal entry position, said transfer arm being arranged to prevent the content from coming out of the processed container during the transfer of said processed container between a first station located at the internal exit position and a second station located at the internal entry position.

To prevent the content from coming out of the container, the transfer arm can be arranged to move the processed container with its open end turned upwards, meaning that the content of the processed container cannot come out of the processed container under the effect of gravity. The transfer arm can also be arranged such that its gripper element seizes the processed container by its neck in such a manner that the centrifugal forces imparted on the processed containers during their transfer do not cause the content of the processed containers to come out of said processed containers.

In a particular embodiment, this is obtained by tilting the axis of the first stations and/or the axis of second stations and by arranging the gripper element to maintain the processed container aligned on an axis parallel to the first station axis and/or to the second station axis between the internal exit position and the internal entry position, as explained previously.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE INVENTION

In the following description, the terms "upstream" and "downstream" are defined relative to the circulation of a container in the rotary machine according to the invention, meaning that the container is located upstream at the entry of the machine and downstream at the exit of the machine. The terms "axial" and "axially" are defined relative to the direction of the main axis A of the machine and the terms "radial" and "radially" are defined relative to planes substantially perpendicular to the axial direction.

The rotary machine according to the invention will be described for containers in the form of preforms intended to be shaped into containers and filled with liquid. More particularly, the invention will be described for a machine arranged to fill preforms with liquid to form and fill containers during a first process and to close the formed and filled containers during a second process. However, the invention is not limited to processing preforms and could be adapted to process various forms of containers subjected to various processes, for example a filling and closing of already formed containers, a decontamination and filling of containers or of preforms, etc.

Figure 1:
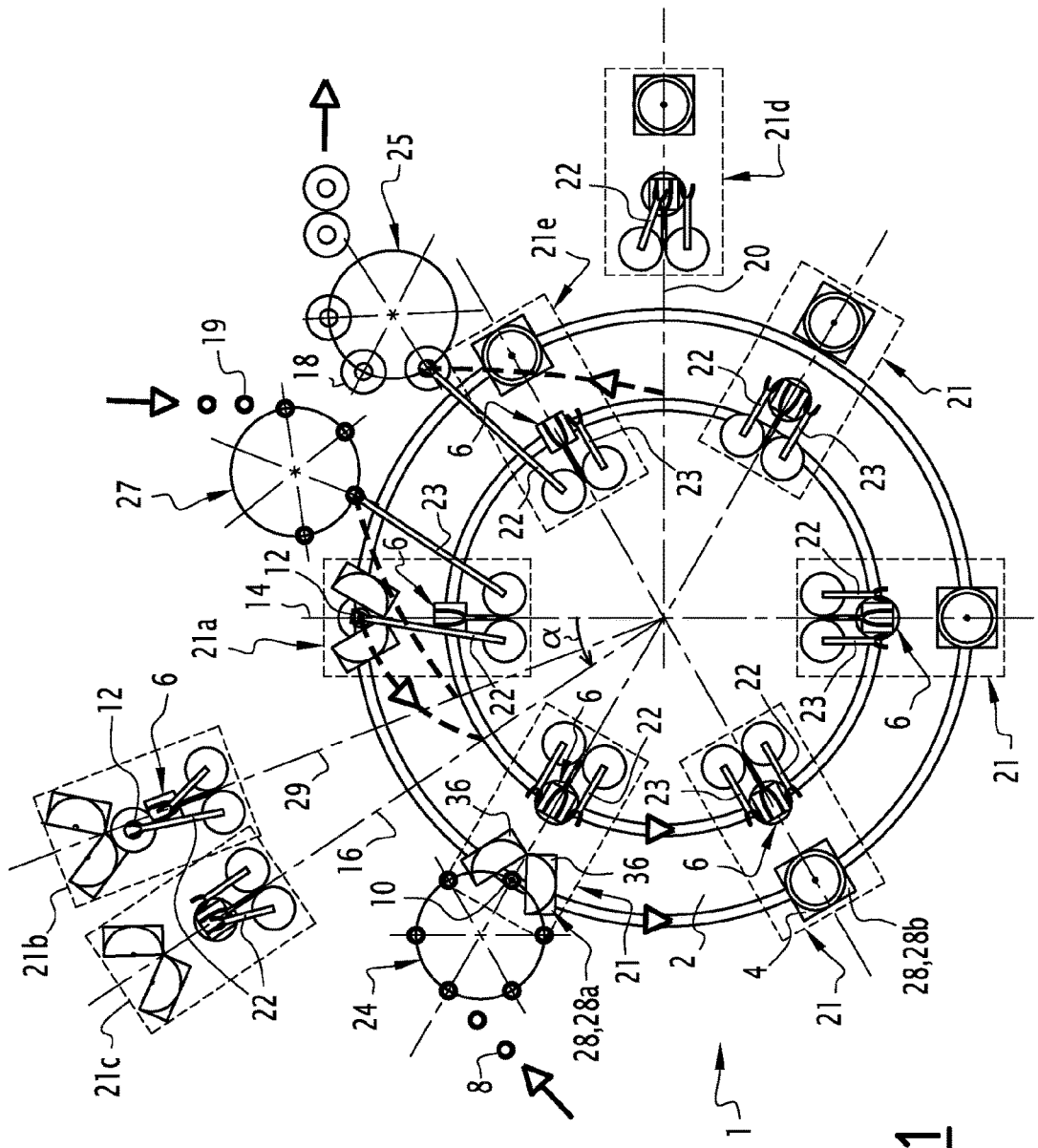
FIG. 1 is a diagrammatical view from above of a rotary machine according to a first embodiment of the invention.

In reference to FIG. 1, a first embodiment of a rotary machine 1 according to the invention is described.

The machine comprises a main wheel 2 movable in rotation around a main axis A and carrying, on its periphery, a plurality of first stations 4 and a plurality of second stations 6. The first stations 4 are axially offset relative to the second stations 6 along the main axis A, meaning that the first stations 4 do not extend in the same radial planes, said radial planes being substantially perpendicular to the main axis A.

The main axis A is for example a substantially vertical axis. In this case, the first stations 4 and the second stations 6 are vertically offset such that the second stations 6 extend above the first stations 4. Alternatively, the second stations 4 can extend under the first stations 6.

According to the embodiment shown in FIG. 1, the first stations 4 are not placed radially at the same distance from the main axis A than the second stations 6. For example, the second stations 6 extend closer to the main axis A than the first stations 4.

The first stations 4 are distributed on the periphery of the main wheel 2 and are each arranged to receive a container 8 to be processed at an external entry position 10, to process the container 8 according to a first process and to release a processed container 12 at an internal exit position 14, each first station 4 rotating with the main wheel 2 around the main axis A between the external entry position 10 and the internal exit position 14. This means that, between the external entry position 10 and the internal exit position 14, a first station 4 has been angularly displaced by a predetermined angle. According to an embodiment, this predetermined angle is as close as possible to 360°, meaning that the external entry position 10 is as close as possible to the internal exit position 14. This reduces the proportion of the first stations that are not currently processing any container 8 at a particular time, meaning that it reduces the number of the first stations that have already completed the first process for one container 8, and have not yet started the same process for the next container 8.

By process, it is meant any kind of succession of operations performed on a container and by processed container, it is meant a container having been subjected to said succession of operations.

According to the embodiment shown in the figures, the first stations 4 are forming and filling stations and the container to be processed is called preform 8. The forming and filling stations 4 are arranged to inject a liquid into preforms 8 to shape said preforms 8 into containers and to fill said containers with the liquid, such that the processed containers 12 are formed and filled containers. Such stations 4 are shown in greater detail in FIGS. 2 to 17 and will be described subsequently. However, as mentioned previously, the first stations 4 could be other kind of stations, for example simple filling stations or stations adapted to carry out another kind of process, such as a decontamination process, wherein a content, such as a decontaminating agent is injected in the containers.

The second stations 6 are distributed on the periphery of the main wheel 2 and are each arranged to receive a processed container 12 at an internal entry position 16, to process the processed container 12 according to a second process and to release a finished container 18 at an external exit position 20, each second station 6 rotating with the main wheel 2 around the main axis A between the internal entry position 16 and the external exit position 20.

According to the embodiment shown in the figures, the second stations 6 are capping stations 6 arranged to place a cap 19 on the processed containers 12, such that the finished containers 18 are filled and capped containers. Such capping stations 6 are shown in greater detail in FIGS. 2 to 14 and will be described subsequently. However, as mentioned previously, the second stations 6 could be other kind of stations adapted to carry out another kind of process, such as a mixing process arranged to add a liquid to the liquid already in the processed containers.

According to the first embodiment, the number of first stations 4 is equal to the number of second stations 6 such that each pair of first station 4 and of a corresponding second station 6 forms a subassembly 21 rotating with the wheel at a predetermined speed. The first stations 4 and the second stations 6 therefore rotate at the same speed, which is the speed of rotation of the main wheel 2.

In FIG. 1, in order to ease the understanding, subassemblies 21b, 21c and 21d are separated from the wheel 2. It should be understood however that these subassemblies are attached to the wheel 2 as the other subassemblies.

According to the first embodiment and as shown in FIG. 1, the internal exit position 14 and the internal entry position 16 are angularly offset in a radial plane by a transfer angle a, meaning that the internal exit position 14 and the internal entry position form together an angle a with the main axis A.

Each subassembly 21 further comprises a transfer arm 22 arranged to move a processed container 12 from a first station 4 located at the internal exit position 14 (subassembly 21*a* of FIG. 1) to a corresponding second station 6 located at the internal entry position 16 (subassembly 21*c* of FIG. 1). Consequently, each transfer arm 22 is arranged to pick up a processed container 12 from a first station 4 located at the internal exit position 14, to move the picked up container 12 from the internal exit position 14 to the internal entry position 16 and to place the container in the corresponding second station 6 located at the internal entry position 16. Advantageously, the transfer arm 22 is movable in translation in the axial direction. This enables locating the first and second stations of the subassembly 21 at different axial positions. The transfer arm 22 may further be movable in translation in a radial direction. This enables locating the first and second stations of the subassembly 21 at different radial positions. Consequently, it is possible to optimize the compactness of the subassembly 21. It is understood that each transfer arm 22 rotates with the main wheel 2 around the main axis A and remains in the vicinity of the first and second stations of the subassembly 21 to which said transfer arm 22 belongs. The transfer arm 22 can be displaced relative to the first and second stations by any appropriate means for example by being a robotic arm or by being moved by piston devices or by being mounted on carriers movable in translation on guiding rails for example. It should be noted that the transfer arm 22 is arranged to move the processed containers 12 with their open end turned upwards, in order to prevent the content of the processed containers 12 from coming out of the processed containers.

The rotary machine 1 further comprises a preform feeding wheel 24 which directly introduces the preform 8 into a mold 28 of the forming and filling station 4. Advantageously, the transfer arm 22 may be further arranged to extract the filled and capped container 18 from the capping station 6 when the capping station 6 is at the external exit position 20 (subassembly 21*d* of FIG. 1) to give it to a container exit wheel 25. The rotary machine 1 may further comprise a cap feeding means 27, such as a star wheel, a caps guide, a cap chute or the like. Each subassembly 21 may further comprise a cap feeding arm 23 arranged to catch a well oriented cap 19 and to deliver the cap 19 into the capping station 6 while the subassembly 21 is at a cap feeding angular position 29 (subassembly 21*b* of FIG. 1). Said cap feeding angular position 29 is located upstream of the internal entry position 16. In a variant, the exit of the filled and capped container 18 may be performed by the said cap feeding arm 23, instead of the transfer arm 22.

FIG. 1 illustrates the transfer arm 22 at a location which is laterally offset with respect to the capping station 6, in order to see the capping station 6. Therefore, the movement of the transfer arm from the mold 28 to the capping station 6 is illustrated as being a rotary motion. One can understand that the transfer arm 22 may alternatively be located in a plan including the neck of the processed container 12 when said container is into the mold 28 and including the same neck when it arrives into the capping station 6. In such an alternative, the transfer arm 22 may not be movable in rotation, and may have only two degrees of liberty, allowing a simple and cost effective mechanism.

The functioning of the rotary machine 1 according to the first embodiment can be summarized as follows.

Successive containers 8 to be processed are fed to the rotary machine 1 at the external entry position 10, for example using the feeding wheel 24 rotating around an axis parallel to the main axis A, while the main wheel 2 rotates around the main axis A. The rotations of the feeding wheel 24 and of the main wheel 2 are synchronized such that a container 8 and a first station 4 are located at the external entry position 10 at the same time.

During a loading step, the container 8 is transferred to the first station 4 at the external entry position 10 and, during a first process step, the first process is carried out on said container 8 while the first station 4 rotates towards the internal exit position 14. When the first station 4 reaches the internal exit position 14, the first process has been completely carried out such that the first station 4 now carries a processed container 12.

During a transfer step, at the internal exit position 14, the transfer arm 22, of the subassembly to which the first station 4 carrying the processed container 12 belongs, picks up the processed container 12 and moves it axially to the internal entry position 16, at which the corresponding second station 6 of the subassembly 21 is located.

At the internal entry position 16, the transfer arm 22 places the processed container 12 in the corresponding second station 6 and, during a second process step, the second process is carried out on said processed container 12 while the second station 6 rotates towards the external exit position 20. When the second station 6 reaches the external exit position 20, the second process has been completely carried out such that the second station 6 now carries a finished container 18.

During an extracting step, starting from the external exit position 20 of the sub assembly 21*d*, the transfer arm 22 can extract the filled and capped container 18 and deliver it to the container exit wheel 25. Alternatively, the extracting step can use any type of extracting device 26 arranged to extract the finished container 18 from the second station 6. An example of extracting device 26 will be described subsequently with reference to FIGS. 17; 19 and 20.

The steps described above are performed for each subassembly 21 of the rotary machine 1 such that successive finished containers 18 are obtained at the external exit position 20 from successive containers 8 fed at the external entry position 10.

The throughput of the rotary machine 1 described above is high since the first process and the second process are carried out simultaneously in parallel and since all the first stations 4 are dedicated to the first process and all the second stations are dedicated to the second process. Furthermore, the driving means of the machine are simple since the first stations 4 and second stations 6 are carried by the same wheel 2 and since the transfer arm 22 may have only two degrees of freedom, i.e. one degree in the axial direction and on degree in the radial direction.

The rotary machine will now be described in more details, in relation to FIGS. 2 to 17 for a machine carrying out a hydroforming process as the first process and a closing process as the second process.

To perform the hydroforming process, the first stations 4 are forming and filling stations using a liquid to shape a preform 8 into a formed and filled container 12.

A preform 8 is for example made of plastics material, for example of polyesters, such as polyethylene therephtalate (PET), polyethylene naphthalate (PEN), polyethylene imine (PEI), polytrimethylene terephthalate (PTT), polylactic acid (PLA), polyethylene furanoate (PEF), or polyolefins, such as polyethylene low density (LDPE) or high density (HDPE), polypropylene (PP), or styrene based materials such as polystyrene (PS), acrylonitrile butadiene styrene (ABS) or other polymers, such as polyvinyl chloride (PVC). Each preform 8 comprises a body in the general shape of a tube of U-shaped longitudinal section, which is closed at one end and the other end of which already has the final shape of the neck 9 of the processed container 12. The lower end, or bottom, of the body is closed and has the general shape of a hemisphere, while the upper end of the preform 8 forms the neck 9, which defines an inner opening and which can be provided with an outer radial collar adapted to receive a lid or a cap for example by screwing. The bottom of the preform 8 is intended to be shaped to form the bottom of the processed container 12, while the neck 9 remains the same from the preform 8 to the processed container 12. The preforms 8 are generally produced according to an injection molding process and molded at a site different from the site where the machine for forming containers 1 is located.

A first station 1 comprises a mold 28 defining a mold cavity 30 having the shape of the processed container 12 to be obtained at the end of the first process and a filling device 32 arranged to inject a liquid into the preform 8 received by the mold 28.

Figure 4:
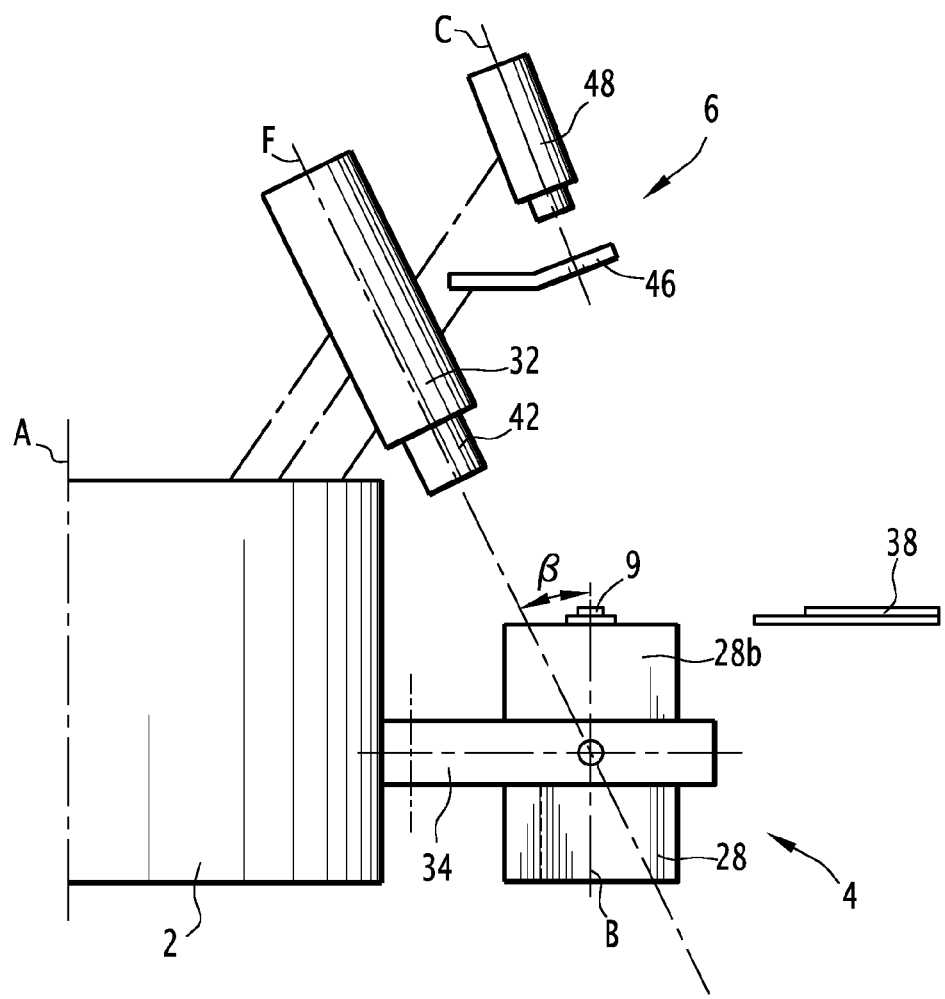
Figure 5:
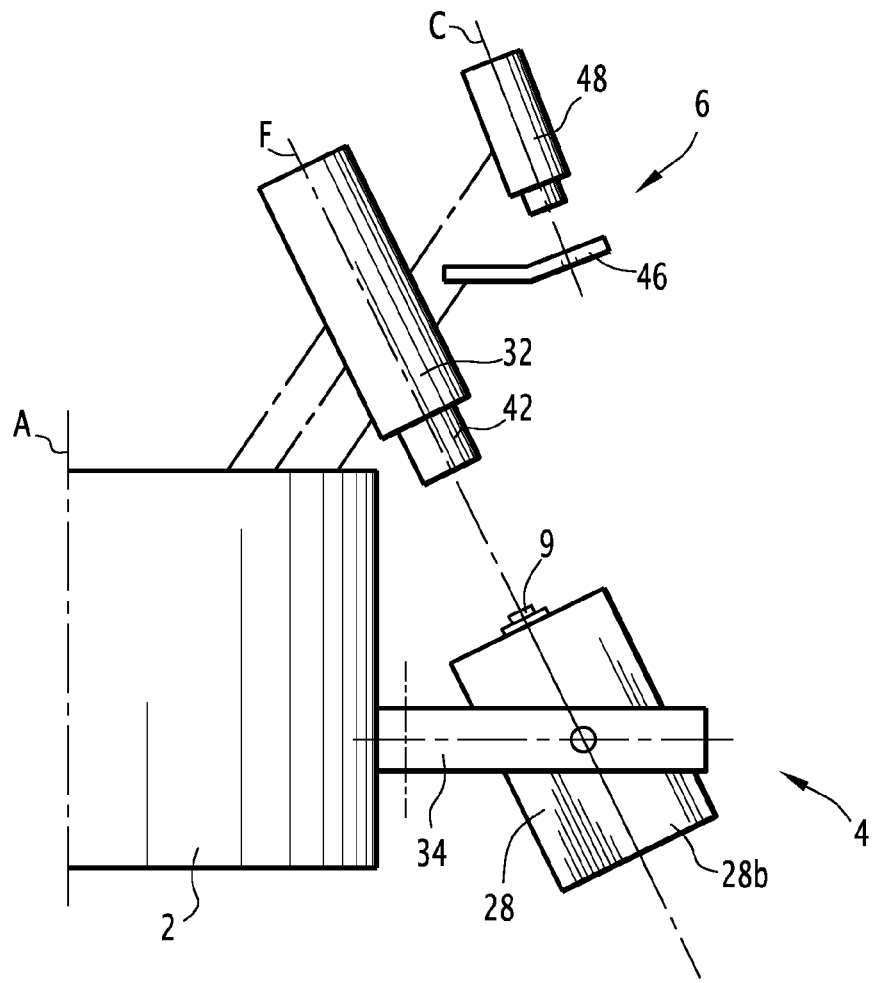

The mold 28 is for example received by a mold holder 34 attached to the wheel 2 and arranged to move the mold 28 between an opened position (28a in the figures) and a closed position (28b in the figures). The mold 28 for example comprises at least two parts 36, movable relative to each other by the mold holder 34 between the opened position and the closed position. In the opened position, the two parts 36 are sufficiently spaced from each other for a preform 8 and for a processed container 12 to be moved radially between the two parts 36. In the closed position, the two parts 36 are applied against each other to form the molding cavity 30 and are arranged to hold the preform 8 by its neck 9 inside the mold cavity 30 such that the neck 9 of the preform 8 protrudes from the molding cavity 30 and closes said molding cavity 30 in a fluid tight manner, as shown in FIGS. 4 and 5, while the inner volume of the preform remains accessible through the inner opening defined by the neck 9.

Such a mold 28 movable between an opened and a closed position is known per se in the hydroforming field and will not be described in greater detail herein.

According to a first variant of the rotary machine 1, the mold 28 is further movable between a straight position, wherein the mold 28 extends along a straight axis B, parallel to the main axis A (FIGS. 2 to 4) and a tilted position, wherein the mold 28 extends along a first station axis F, which is tilted relative to the main axis A (FIGS. 5 to 11). By tilted, it is meant, that the first station axis F forms an angle 13 with the main axis A, said angle β being arranged such that the mold 28 is tilted towards the center of the wheel 2 in its tilted position. Angle β is arranged to prevent the centrifugal force imparted on the liquid filling the preform during the first process to cause a spilling of said liquid. Consequently, by placing the mold 28 in the tilted position, it is possible to overcome the effects of the centrifugal force caused by the rotation of the wheel 2. It should be noted that angle β increases with the rotation speed of the main wheel 2, meaning that the more important the rotation speed is, the greater angle β has to be to overcome the effects of the centrifugal force. According to an example, angle β is comprised between 30° to 60°, for example about 45°.

Figure 2:
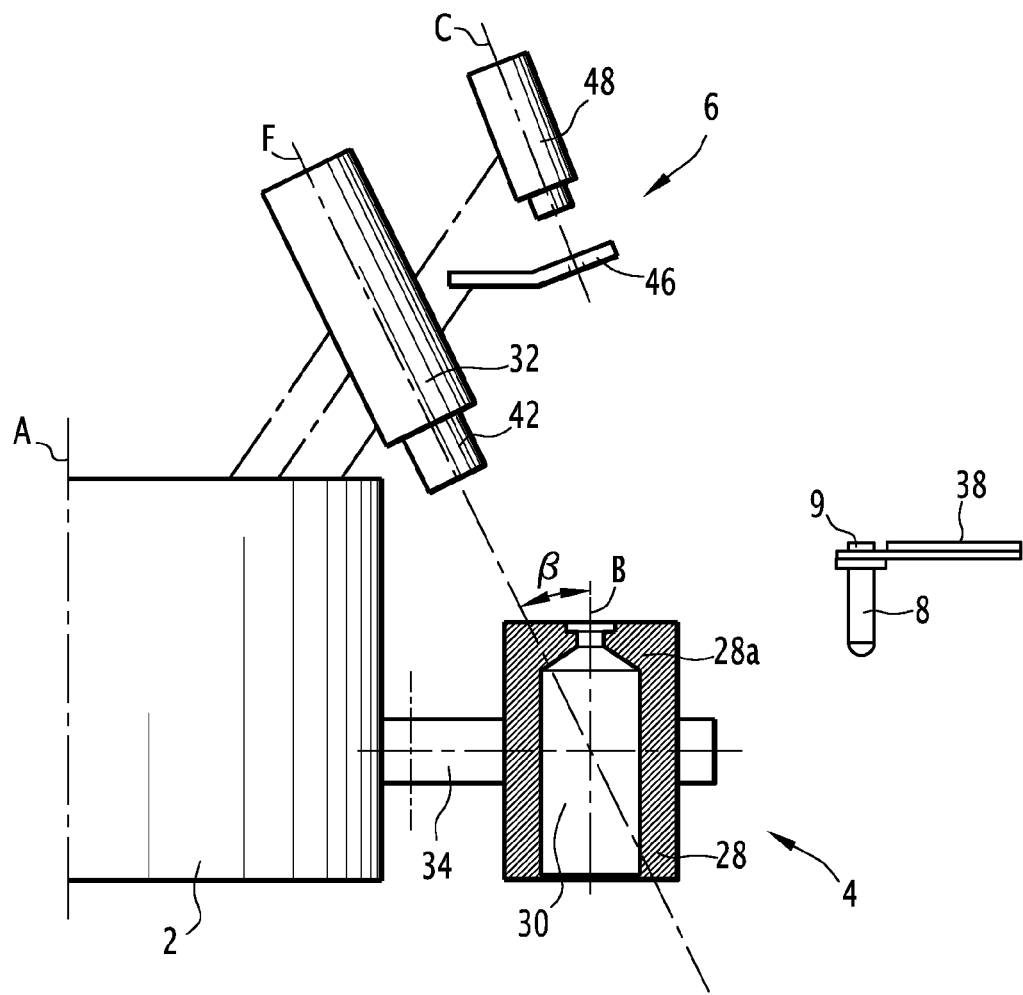
FIGS. 2 to 5 are diagrammatical side views of the rotary machine according to the first embodiment during the loading step.
Figure 3:
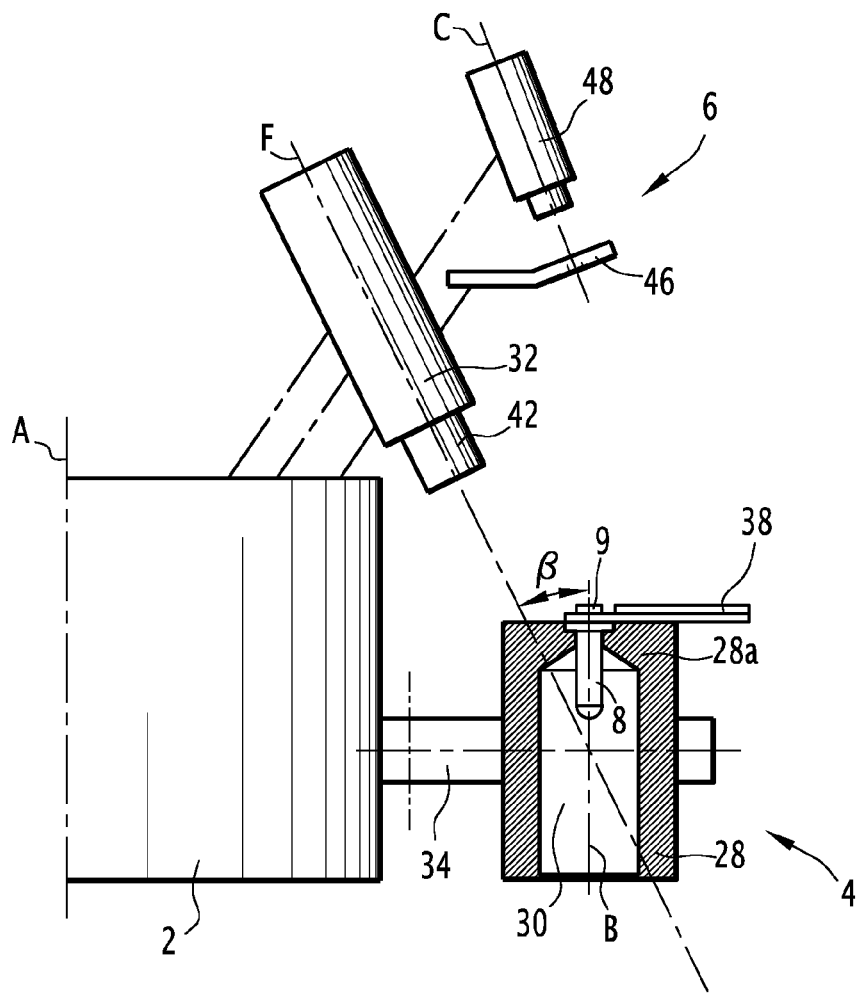

The loading step according to the first variant described above is shown in FIGS. 2 to 5. Upstream of the external entry position 10, the mold 28 is placed in the opened position and in the straight position, as shown in FIG. 2. The rotation of the wheel 2 moves the opened and straight mold 28 to the external entry position 10. During this movement, a preform 8 is also moved to the external entry position 10 to be placed in the mold 28, as shown in FIG. 3. The preform 8 is for example held by a neck holding device 38 attached to the feeding wheel 24 and may be movable in translation radially relative to the feeding wheel 24 between a retracted position (FIG. 2), wherein the neck holding device 38 is spaced from the main wheel 2 and a feeding position (FIG. 3), wherein the neck holding device 38 extends in the path of the main wheel 2. The neck holding device 38 is for example formed by a fork element arranged to hold the preform 8 by its neck 9, the axis of the preform 8 being parallel to the main axis A, as shown in FIG. 2.

At the external entry position 10, the neck holding device 38 maintains the preform 8 between the two mold parts 36 while the mold 28 is moved to its closed position by the mold holder 34. The neck holding device 38 moves back to its retracted position and the preform 8 is held by the mold 28, with its neck protruding from the mold 28, as shown in FIG. 4.

According to the first variant of the loading step, the mold 28 is then moved to its tilted position so as to align the axis of the preform 8 with the tilted first station axis F, as shown in FIG. 5. The first process of injecting a liquid in the preform 8 can then be performed while the wheel 2 rotates towards the internal exit position 14, as will be described subsequently.

Figure 6:
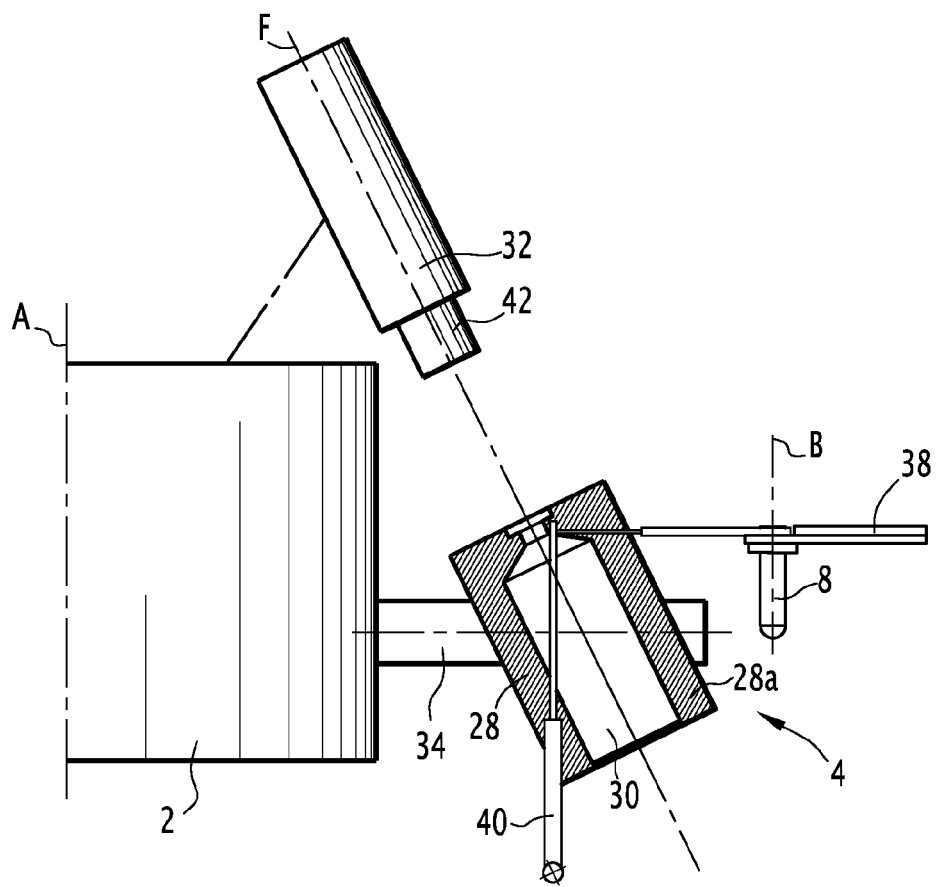
FIGS. 6 to 8 are diagrammatical side views of a variant of the first embodiment of the rotary machine during the loading step.
Figure 7:
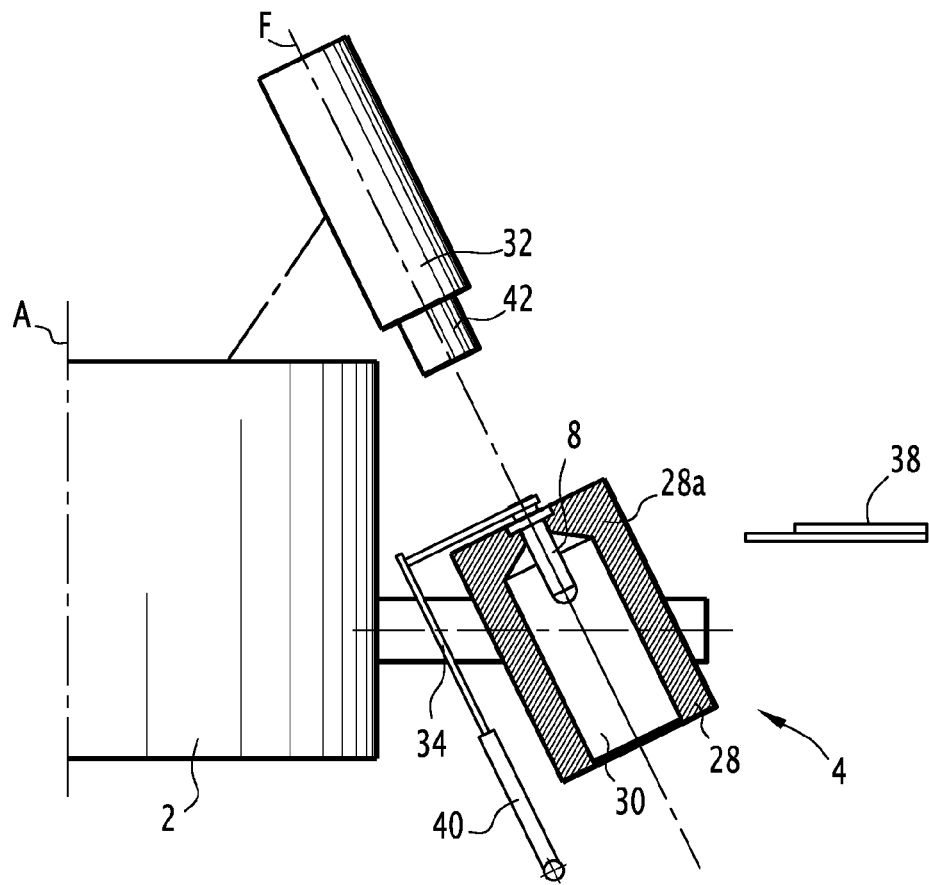
Figure 8:
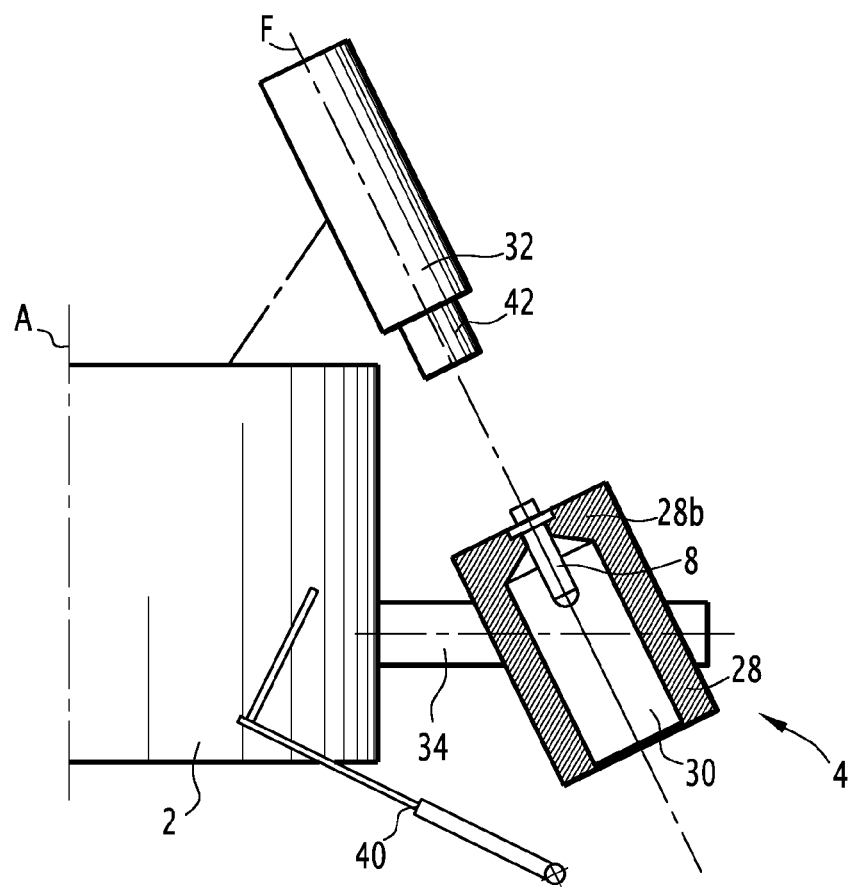

According to a second variant of the loading step shown in FIGS. 6 to 8, the mold 28 is fixed relative to the wheel and is permanently in the tilted position. This means that the mold 28 always extends along the tilted first station axis F. According to this second variant, the preform 8, which extends along an axis B parallel to the main axis A in the feeding wheel 24 has to be tilted to extend along the first station axis F to be placed in the old 28 in the tilted position. To this end, the machine 1 further comprises a tilting arm 40, movable at least between a straight position (FIG. 6), wherein the tilting arm 40 is arranged to grab a preform 8, extending along an axis parallel to the main axis A, from a neck holding device 38, and a tilted position (FIG. 7), wherein the tilting arm 40 holds the preform 8 aligned on the first station axis F at the external entry position 10. The tilting arm 40 can be further movable to a retracted position (FIG. 8), wherein the tilting arm 40 is spaced from the loading wheel 24 and from the external entry position 10.

During the loading step according to the second variant described above, the mold 28 is moved to its opened position upstream of the external entry position 10 while the tilting arm 40 is moved to its straight position to pick up a preform 8 from a neck holder device 38 of the feeding wheel 24 (FIG. 6). The tilting arm 40 is then moved to its tilted position, while the mold 28 reaches the external entry position 10 (FIG. 7), and holds the preform 8 aligned on the first station axis F while the mold 28 is closed. The tilting arm 40 is then moved to its retracted position, while the mold 28 in the closed position holds the preform aligned with the first station axis F, as shown in FIG. 8. The first process of injecting a liquid in the preform 8 can then be performed while the wheel 2 rotates towards the internal exit position 14, as will be described subsequently.

It should be noted that in the second variant of the loading step, the mold holder 34 and the feeding wheel 24 can be simplified since there is no need to move the mold 28 in the tilted position and to move the neck holder device 38 to a feeding position. However, this variant requires an additional tilting arm 40, the movements of which need to synchronized with the movements of the main wheel 2 and of the feeding wheel 24.

Figure 9:
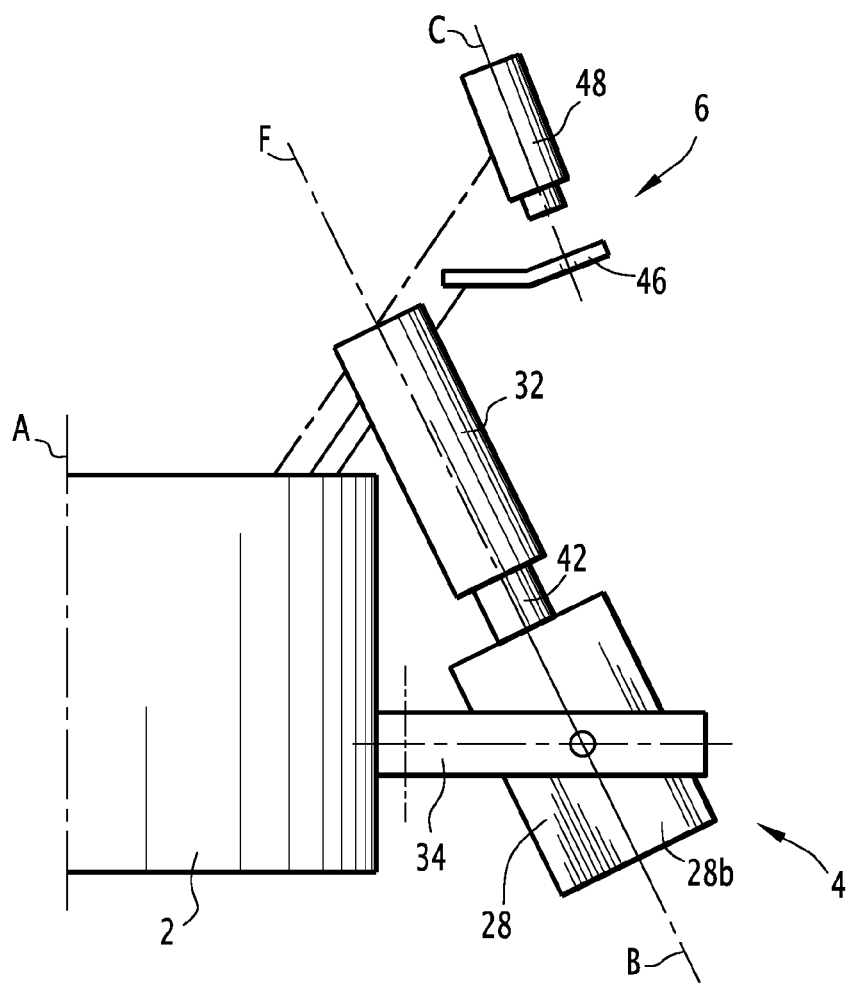
FIGS. 9 to 17 are diagrammatical side views of the first embodiment of the rotary machine during the further steps following the loading step.

After any of the above variant of loading step, the first process can take place (FIG. 9).

The filling device 32 arranged to inject a liquid into the preform 8 received by the mold 28 for example comprises means to inject a pressurized liquid from a liquid source (not shown) via an injection nozzle 42 placed in fluidic communication with the inner opening of the neck 9 of a preform 8 during the first process step. Such a filling device 32 is known per se and will not be described in greater detail herein. It should be noted however that, according to the first variant and to the second variant described above, the injection nozzle 42 extends along the first station axis F to be aligned with the mold 28 in the tilted position and to inject a liquid in the direction of said first station axis, as shown in FIGS. 2 to 17. The filling device 32 is movable in translation along the first station axis F between a retracted position (FIGS. 2 to 8 and 10 to 17), wherein the filling device 32 is spaced from the mold 28 and allows said mold 28 to be opened for receiving a preform 8 and retrieving a processed container 12; and an injection position (FIG. 9), wherein the injection nozzle 42 is placed in fluidic communication with the inner opening of the neck 9 of the preform 8.

After the loading step described previously, the filling device 32 is moved to its injection position and the first process is performed while the first station 4 rotates towards the internal exit position 14. As known per se, during the first process, a pressurized liquid is injected in the preform 8 causing the wall of the preform 8 to be urged against the wall of the molding cavity 30 while the liquid fills the preform 8 during its deformation. At the end of the first process, the preform 8 has acquired the shape of the molding cavity 30 and is filled with liquid as shown in FIG. 7. As mentioned previously, the first process is carried out during most of one turn of the wheel 2.

Figure 10:
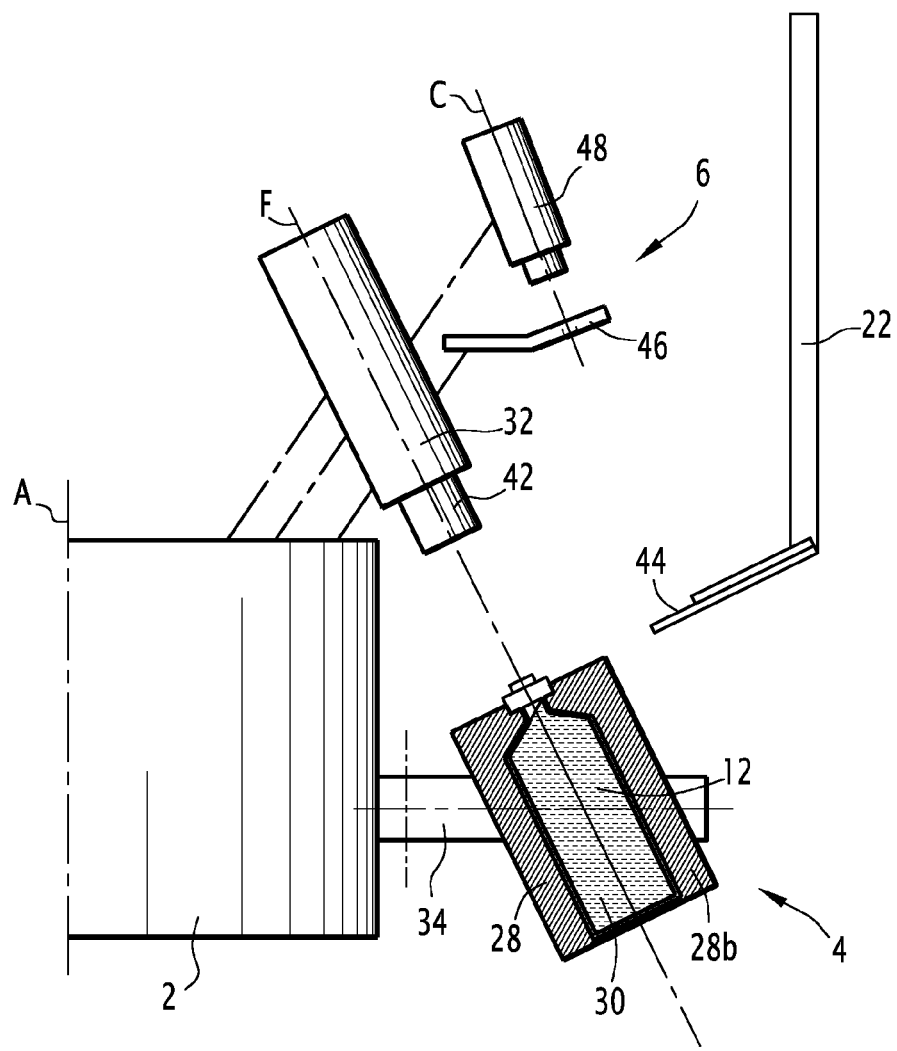
Figure 11:
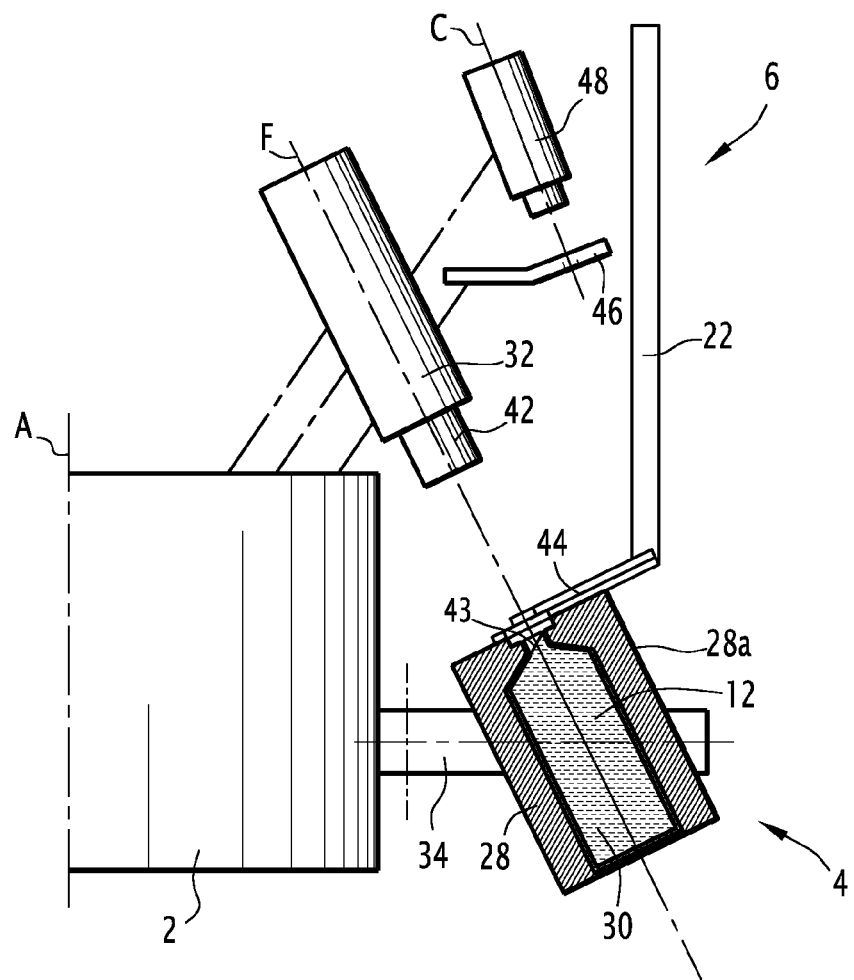

Prior to reaching the internal exit position 14, when the first process is completed, the filling device is moved back to its retracted position and the mold 28 begins to move to its opened position, as shown in FIG. 10, said position being fully reached when the mold 28 is at the internal exit position 14 such that the transfer arm 22 can seize the processed container 12, as shown in FIG. 11. The filling device 32 is arranged to leave a head space free of liquid at the top of the filled container 12. Due to the centrifugal force, a free level 43 of liquid may not be horizontal.

Figure 12:
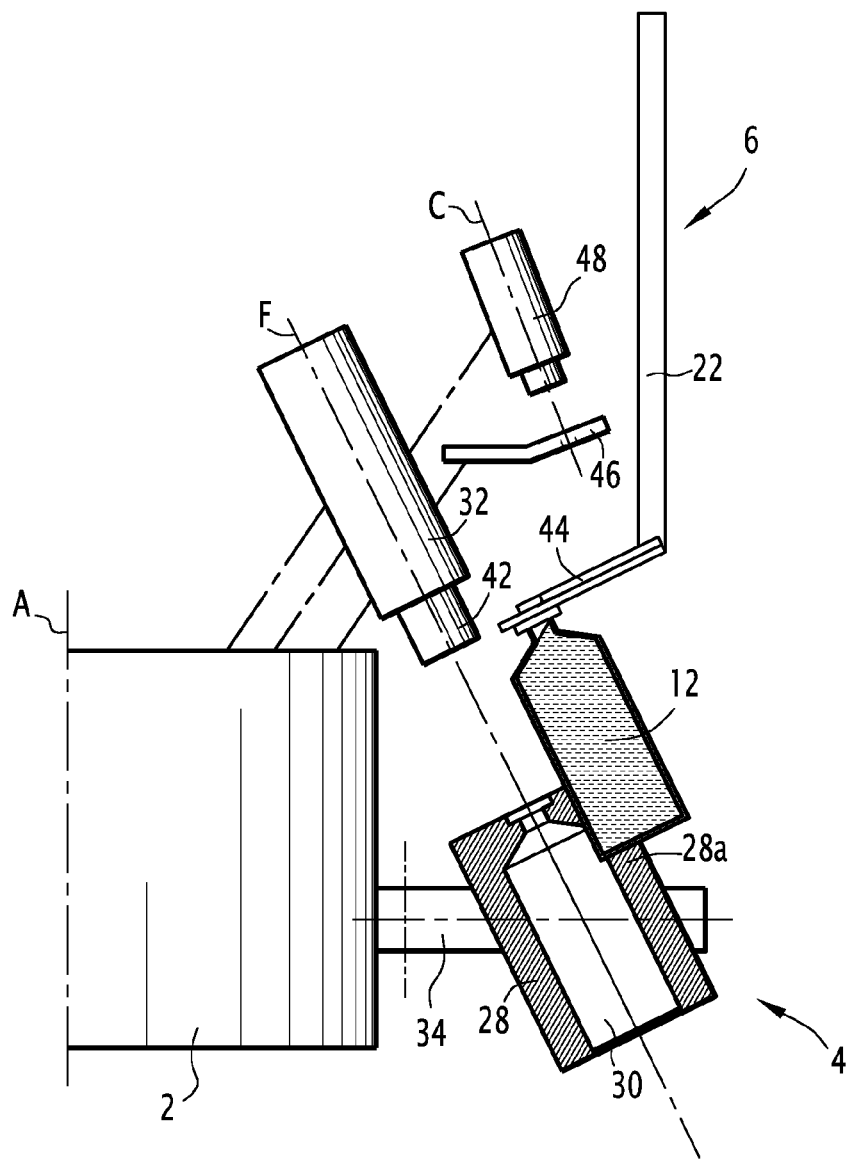
Figure 13:
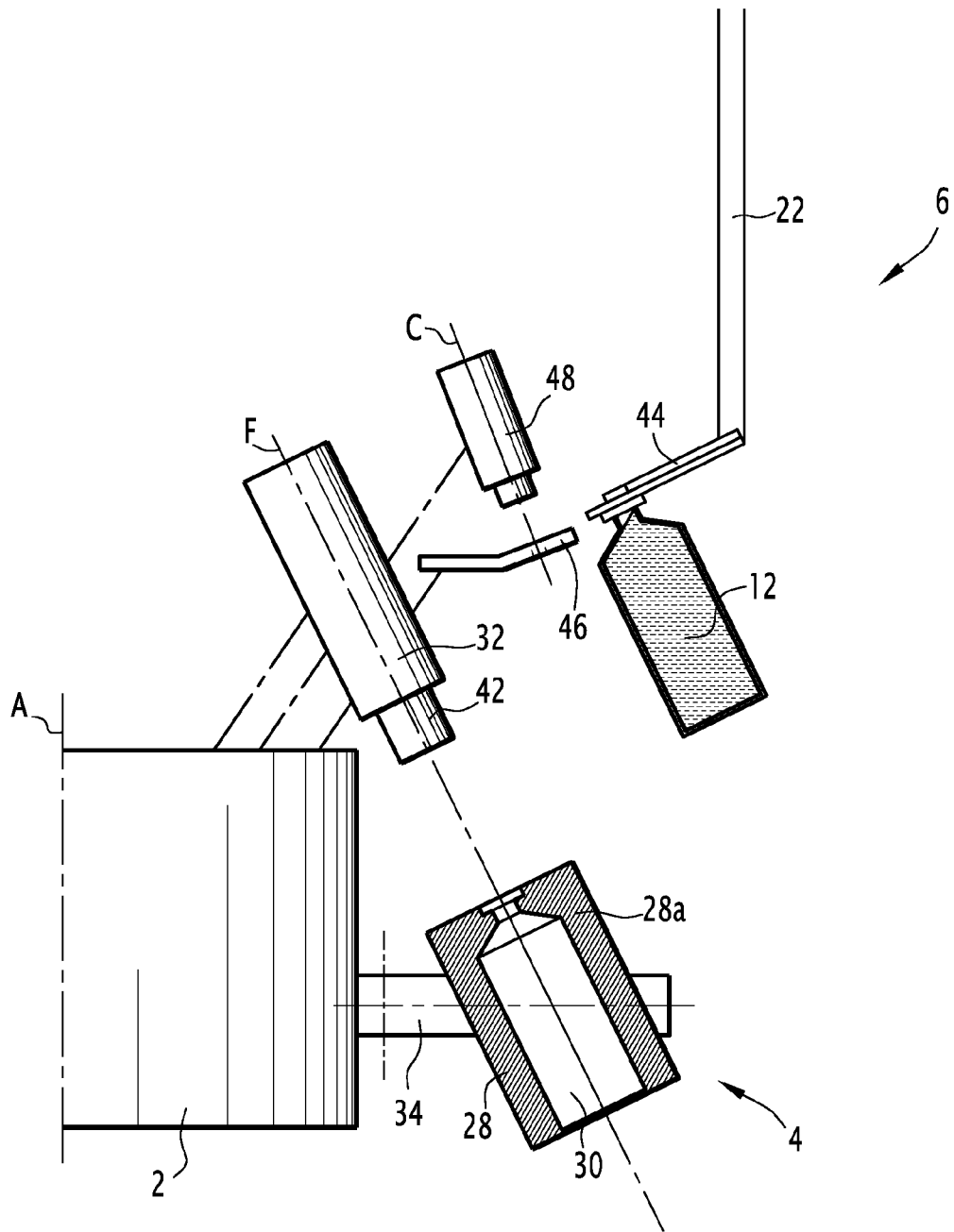
Figure 14:
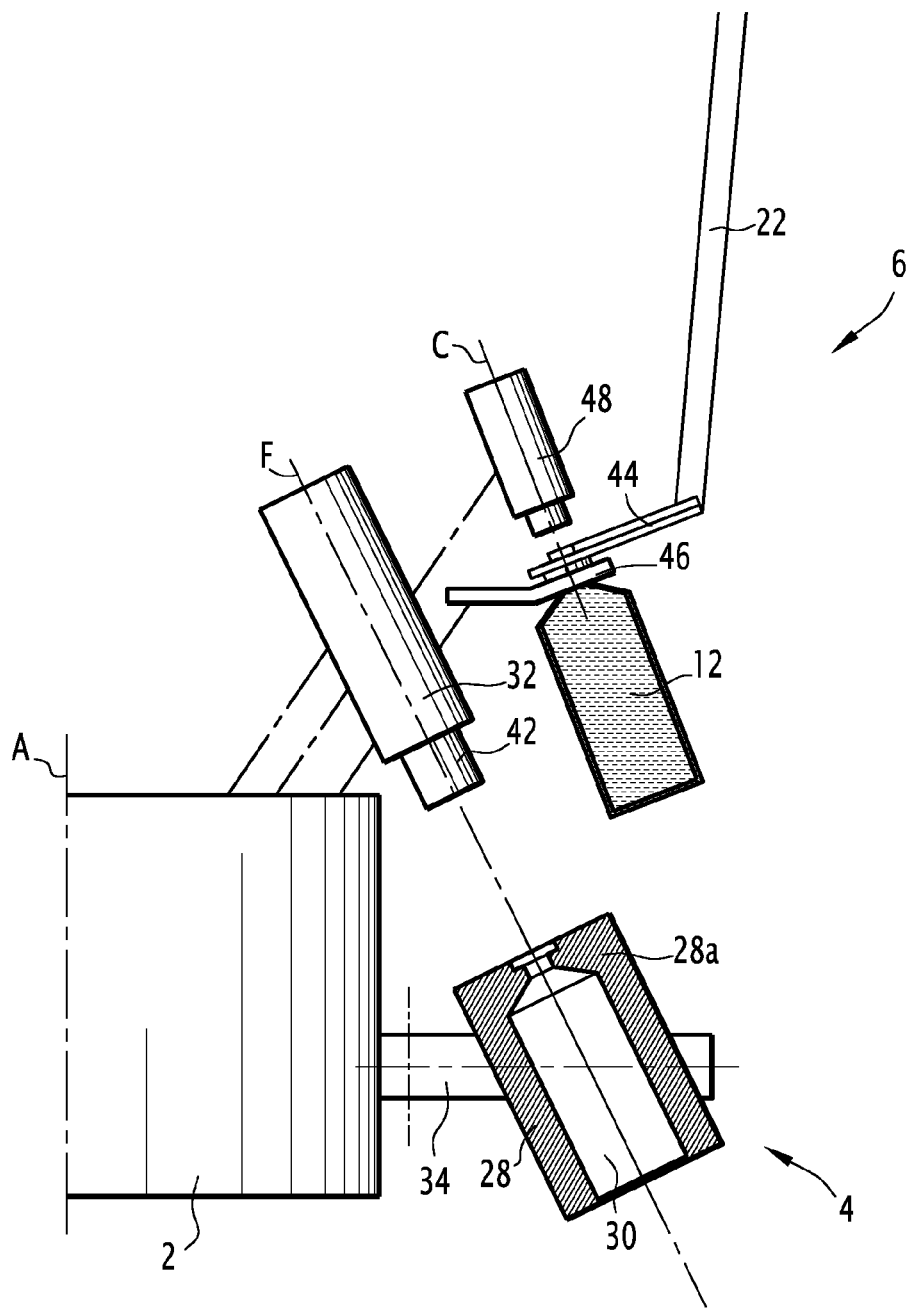

The transfer arm 22 comprises a gripper element 44 arranged to be able to seize and hold a processed container 12 by its neck. The gripper element 44 is for example formed by a fork element arranged to hold the processed container 12 by its neck 9. According to the first and second variants described above, the gripper element 44 is further arranged to maintain the processed container 12 aligned on an axis parallel to the first station axis B, i.e. the processed container 12 remains tilted during the transfer step, as shown in FIGS. 12 to 14. To maintain the processed container 12 tilted, the gripper element 44 for example extends in a plane substantially perpendicular to the first station axis B, as shown in FIG. 8. As the transfer arm 22 rotates simultaneously during the transfer step, the free level 43 of the liquid remains at its equilibrium inclination due to the centrifugal force. There is no splashing.

While the mold 28 reaches the internal exit position 14, the transfer arm 22 is moved in translation axially and radially to place the gripper element 44 around the neck 9 of the processed container 12 contained in the mold 28. The movement of the main wheel 2 and the movements of the transfer arm 22 are synchronized such that when the mold 28 is at the internal exit position 14, the gripper element 44 is around the neck 9 of the processed container 12 as shown in FIG. 8 such that the transfer step can take place.

During the transfer step, the transfer arm 22 is moved radially and axially relative to the main wheel 2 to retrieve the processed container 12 from the mold 28 and to move the processed container towards the internal entry position 16, as shown in FIGS. 9 to 11.

It should be noted that the mold 28 from which the processed container 12 has be retrieved remains in the open position and is moved to the external entry position 10 to receive a new preform 8. According to the first variant, the mold 28 is moved to its straight position between the internal exit position 14 and the external entry position 10. According to the second variant, the mold stay straight and the tilting arm 40 is moved to receive the new preform 8.

When the transfer arm 22 places the processed container 12 at the internal entry position 16, a second station 6 is at the internal entry position 16 to receive the processed container 12.

To perform the closing process, the second station 6 comprises a container seat 46 and a capping device 48.

Figure 15:
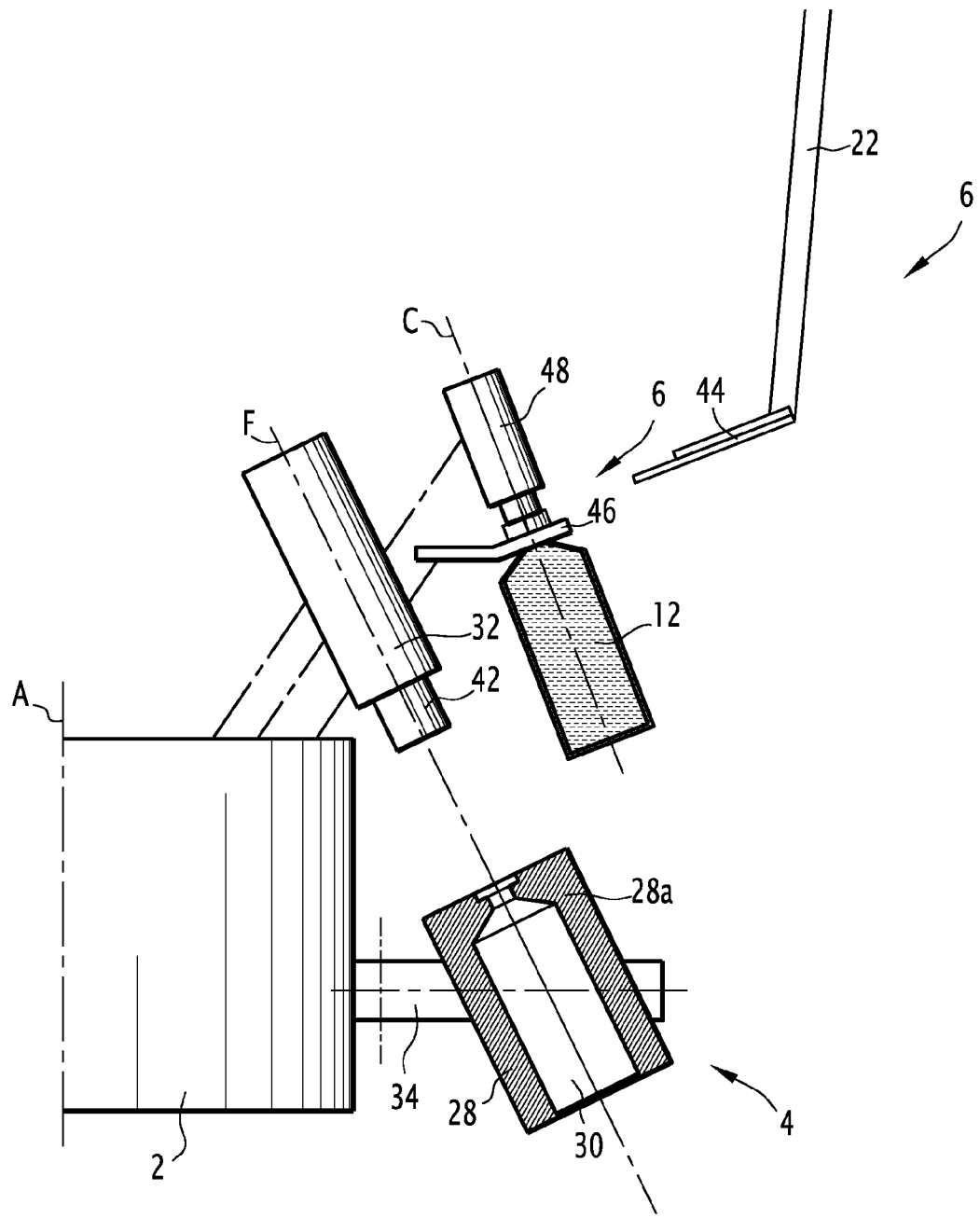
Figure 16:
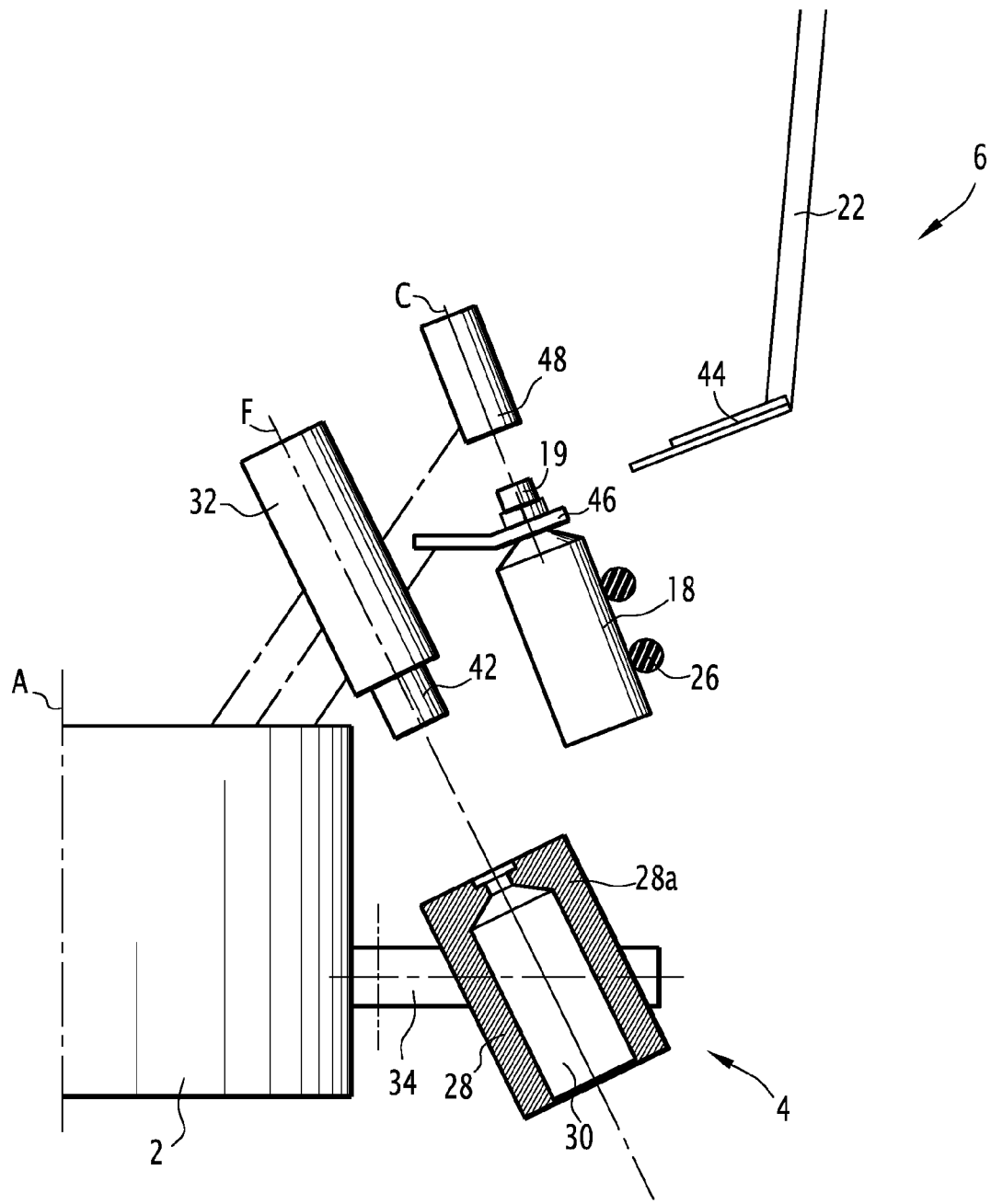

The container seat 46 is for example formed by a fork element arranged to hold a processed container 12 by its neck 9, as shown in FIGS. 14 to 16. The fork element comprises an opening arranged to receive the neck 9 of the processed container. According to the first and second variants, the container seat 46 is arranged to hold the container aligned on an axis parallel to the first station axis F. To this end, the opening of container seat 46 extends along a second station axis C substantially parallel to the first station axis F. Consequently the second station axis C is tilted relative to the main axis A and forms an angle with said main axis A, which is substantially equal to the angle β between the first station axis B and the main axis A. The capping device 48 is conventional for this type of capping process and comprises means for applying a cap 19 on the neck of the processed container, for example screwing means, snap fitting means, or other kind of means suitable for attaching a cap on the processed container 12. According to the first and second variants, the capping device 48 also extends along the second station axis C. The capping device 48 is movable in translation along the second station axis C between a retracted position (FIGS. 2 to6; 10 to14 and 16 and17), wherein the capping device is spaced from the container seat 46 and allows said container seat 46 to receive a processed container 12 and to retrieve a finished container 18; and a capping position (FIG. 15), wherein the capping device 46 is placed on the neck 9 of the processed container 12 and applies a cap on said neck 9. As mentioned previously, the second stations 6 are conventional for applying a cap on a container and will not be described in more detail herein.

According to the first embodiment shown in the FIGS. 1-17, the movement of the transfer arm 22 from the internal exit position 14 to the internal entry position 16 involves a radial displacement during the axial displacement to move the processed container away from the first and second stations in the radial direction (FIGS. 12 and 13) and a movement in the radial direction to place the processed container 12 in the container seat 46, once the gripper element 44 has been properly aligned axially with the container seat (FIGS. 13 and 14). However, it should be understood that the displacement cinematic of the transfer arm 22 could be different, depending on the position axially and radially of the second station 6 relative to the first station 4 and to the space requirement of the first stations and second stations 6. By maintaining the processed container 12 substantially aligned on an axis parallel to the first and second station axes, it is guaranteed that the spilling of liquid out of the processed container 12 is prevented during the transfer step.

Once the transfer arm 22 has placed the processed container 12 on the container seat 46, the transfer arm 22 is moved back to a retracted position, ready to perform another transfer step with the processed container 12 obtained from the new preform 8 which is placed in the mold 28 when the mold 28 reaches the external entry position 10. It should be noted that the loading steps and the first process steps performed on a subsequent preform have not been shown in FIGS. 13 to 17, showing the transfer step, the second process step and the extracting step performed on the processed container 12; in order to simplify the understanding of the drawings.

Once the container seat 46 has received the processed container 12, the second process step is performed in the second station 6 during the rotation of said second station 6 from the internal entry position 16 to the external exit position 20. As known per se, during the second process, the capping device 48 is moved to its capping position (FIG. 15) and attaches a cap 19 on the neck of the processed container 12 to close the processed container 12. At the end of the second process, the processed container 12 is closed by the cap 19, as shown in FIG. 16. The second process may be carried out during most of one turn of the main wheel 2.

Prior to reaching the external exit position 20, when the second process is completed, the capping device 48 is moved back to its retracted position, as shown in FIG. 16.

Figure 17:
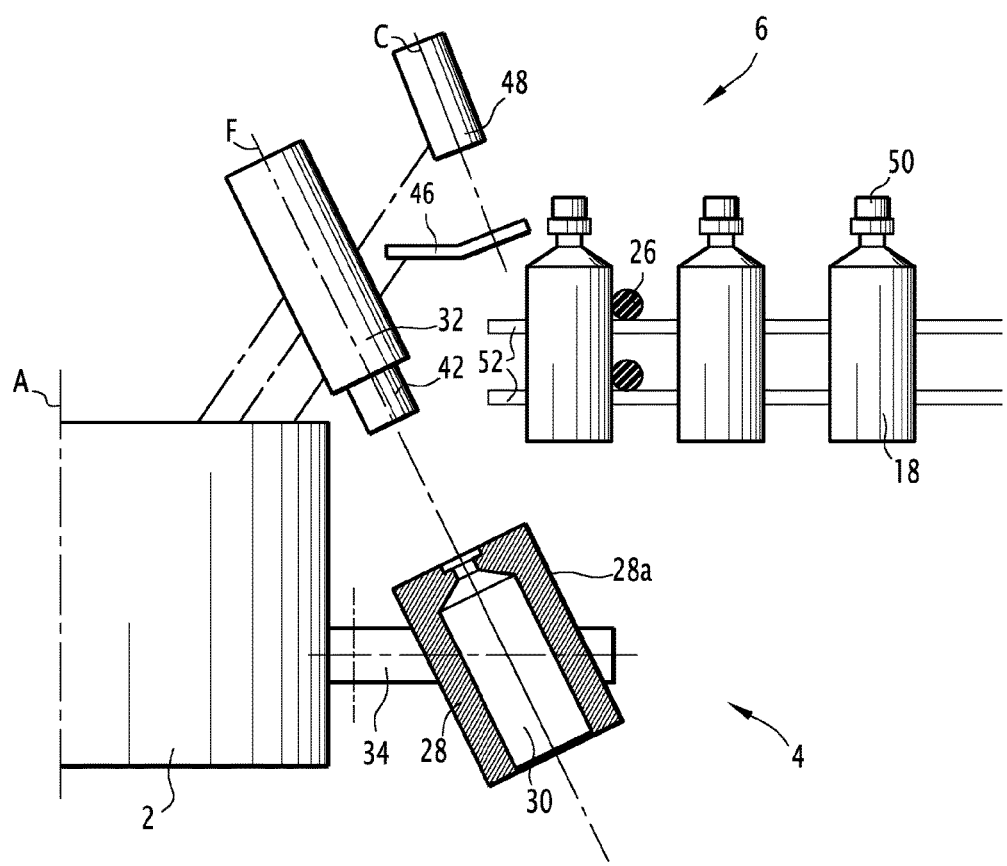

A variant of the extracting device 26 is now described in reference to FIG. 17. The finished container 18, formed by a filled and closed container, can be extracted from the rotary machine using an extracting device 26 provided at the external exit position 20. Such an extracting device 26 is for example formed by one or two rails 52 extending substantially radially in the path of the second stations 6. When the second station 6 reaches the external exit position 20, the finished container 18 is stopped by the rail(s) 52, which is arranged to move the finished container 18 out of the container seat 46 and to move the finished container 18 to a straight position, wherein the finished container 18 extends along an axis parallel to the main axis A. Such an extraction and straightening of the finished container 18 can be obtained by a particular curved shape of the rail(s) 52, as illustrated in FIGS. 19 and 20 about the second embodiment.

Figure 19:
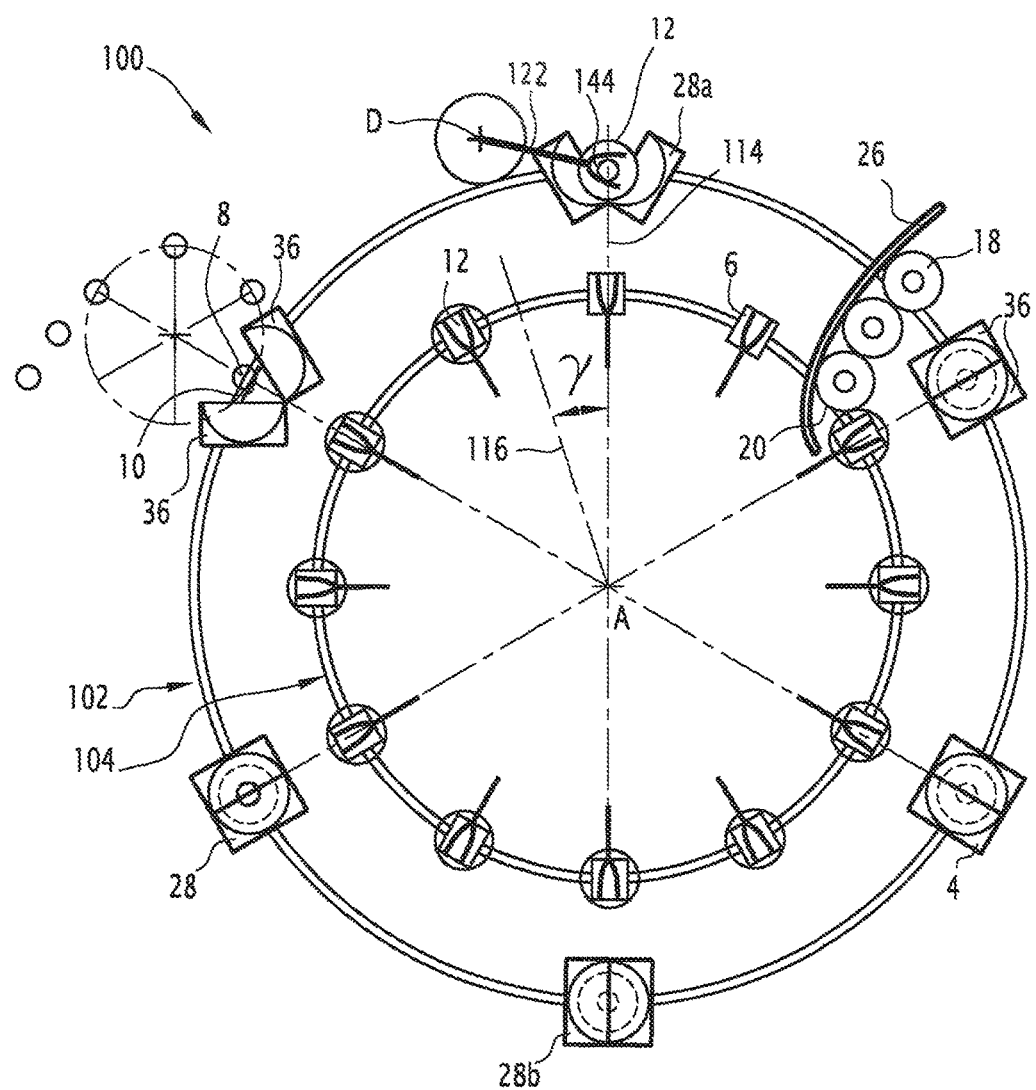
FIGS. 19 and 20 are diagrammatical side views from above of a rotary machine according to a second embodiment of the invention.
Figure 20:
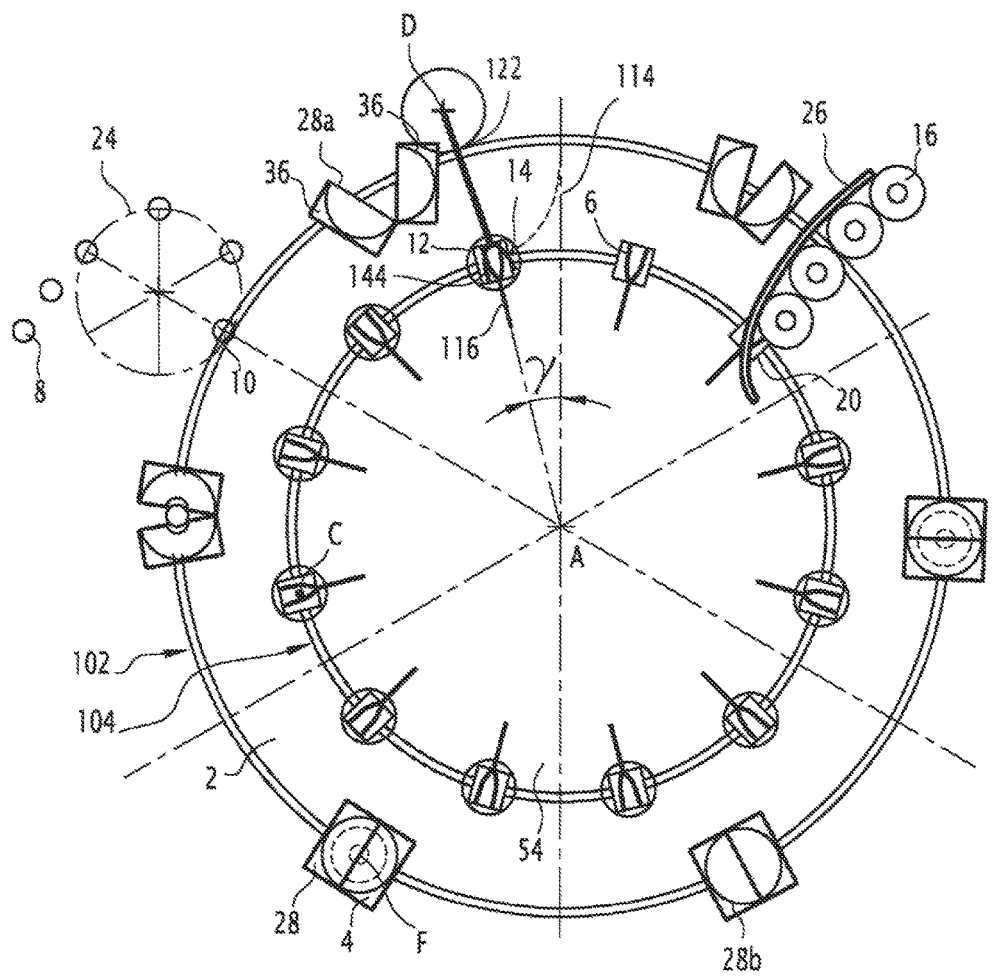

The finished container 18 are then moved radially out of the rotary machine 1, guided by the rail(s) 52, as shown in FIGS. 17 and 19, while they rest for example on an extraction conveyor (not shown). It should be noted that the finished containers 18 are straightened only once they have been closed so as to avoid any risks of spilling.

Figure 18:
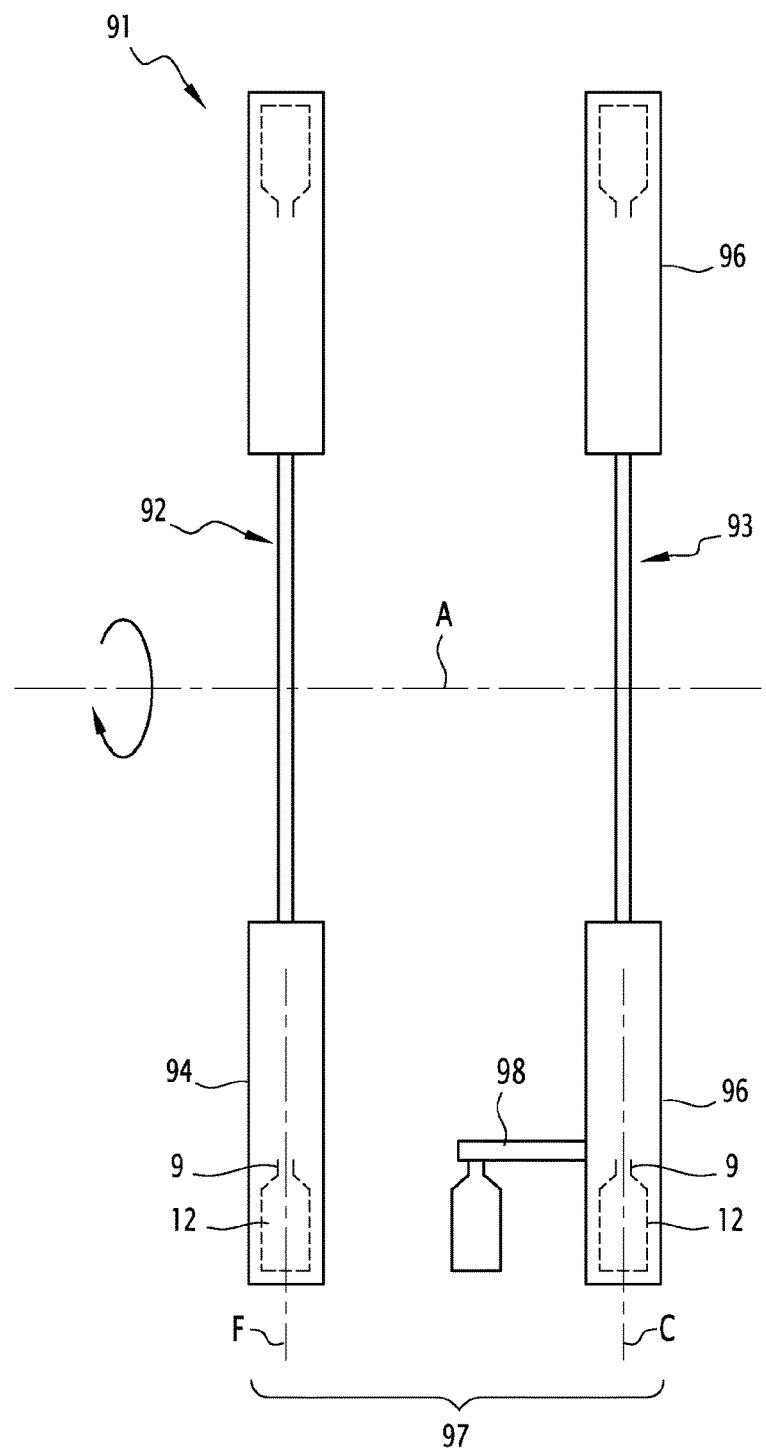
FIG. 18 is a diagrammatical cross section view of another variant of the first embodiment of rotary machine.

Another variant of the first embodiment is now described in reference to FIG. 18. A rotary machine 91 according to such a variant may comprise two wheels 92 and 93, having the same main axis of rotation A which is horizontal or deviates from the horizontal by an angle smaller than 20°. Both wheels 92 and 93 have the same rotation speed. The wheel 92 drives N forming and filling stations 94 and the wheel 93 drives N capping stations 96. Each of the forming and filling stations 94 has one corresponding capping station 96, both being in the same or substantially the same angular position, such that these two stations form a subassembly 97. The first axis F of each forming of filling station 94 is a radial axis or forms with the radial direction an angle smaller than 20°. The second axis C of each capping station 96 is a radial axis or forms with the radial direction an angle smaller than 20°. Advantageously, the first axis F and the second axis C of a subassembly 97 are parallel or substantially parallel at least when the subassembly 97 is at the extreme lower end of the rotary machine 91. In addition to the corresponding filling and capping stations 94, 96, each subassembly 97 further comprises a transfer arm 98. The transfer step is as previously described for the rotary machine 1. Additionally the transfer step takes place when the subassembly 97 is at the extreme lower end of the rotary machine 91. The fact that the first and second axes F, C are substantially parallel during the transfer, and that the filled containers under transfer are substantially vertical with the neck 9 in the upper part of the container 12 and opening upward, reduces a lot the spillage risks and simplifies the transfer arm mechanism.

A rotary machine 100 according to a second embodiment of the invention will now be described in reference to FIGS. 19 and 20.

In this second embodiment, the first stations 4 and second stations 6 can be as described above. However, the variants described previously can also be applied to the rotary machine 1. Furthermore, apart from the transfer step, the rotary machine 100 performs the same steps as in the first embodiment, meaning that the loading step, the first process step, the second process step and the extraction step are performed as described previously and will not be described again.

The first stations are carried by a first main wheel 102 and the second stations are carried by a second main wheel 104. The main wheels 102 and 104 are coaxial and both rotate around the main axis A, each at its own speed, i.e. the first main wheel 102 rotates at a first rotation speed W1 and the second main wheel 104 rotates at a second rotation speed W2.

The number of first stations 4 is different from the number of second stations 6 and a single transfer arm 122 is provided, instead of one transfer arm per subassembly as in the first embodiment. The transfer arm 122 is further not movable in rotation around the main axis A and remains in the vicinity of the internal exit position 14 and of the external entry position 16.

The relation between the first rotation speed W1, the second rotation speed W2, the number N1 of first stations 4 and the number N2 of second stations 6 is:

$$\frac{W2}{W1} = \frac{N1}{N2}$$

In the case of a hydroforming process as the first process and of a closing process as a second process, the first stations require more space than the second stations, meaning that a limited number of first stations 4 can be provided on the first main wheel 102, while a greater number of second stations 6 can be provided on the second main wheel 104, thereby allowing a time for the second process longer or shorter than the time for the first process. Consequently, the machine 100 can be used for other type of processes.

However, the cinematic of the machine 100 is more complicated. Different guiding means have to be provided for the first main wheel 102 and for the second main wheel 104 since said wheels rotate at different speeds. Furthermore, during the transfer step, the transfer arm 122 having a gripper element 144 has to pick up a processed container 12 from a first station 4 rotating at the first rotation speed at an internal exit position 114 and has to place the processed container 12 in a second station 6 rotating at the second rotation speed at an internal entry position 116.

To this end, the internal exit position 114 and the internal entry position 116 are angularly offset in a radial plane and form together an angle y relative to the main axis A, as shown in FIGS. 19 and 20. Angle y is arranged such that a second station 6 rotating at the second rotation speed is located at the internal entry position 116 when the gripper element 144, having picked up a processed container 12 from a first station 4 rotating at the first rotation speed at the internal exit position 114 (FIG. 19), reaches the internal entry position 116, thereby allowing the transfer arm 122 to place the processed container 12 in the second station 6 (FIG. 19).

Furthermore, in addition to be movable in translation axially and radially to move a processed container from a first station 4 on the first main wheel 102 to a second station 6 on the second main wheel 104, the transfer arm has to be movable in rotation around an axis D parallel to the main axis A in order to be able to move the processed container 12 in a radial plane to cover the distance in the radial plane between the internal exit position 114 and the internal entry position 116 due to angle y. During this rotation around axis D, the transfer arm 122 has to decelerate or accelerate the processed container 12 in order to adapt its rotation speed to the second rotation speed. In the example illustrated, the transfer arm 122 decelerates as the second rotation speed is half of the first rotation speed. In order to fulfill all these requirements, the transfer arm 122 can for example be formed by a robotic arm, having all the required degrees of freedom. It should be noted that the transfer arm 122 is arranged to move the processed containers 12 with their open end turned upwards, in order to prevent the content of the processed containers 12 from coming out of the processed containers.

As mentioned previously about the rotary machine 1, it is possible to limit the risks of spilling due to the rotation speeds of the machine 100. A variant of the machine 100 could also be adapted to first and second stations 4, 6 extending along straight axes F, C substantially parallel to the main axis A. The structure of machine 100 according to such a variant would be simplified since there would be no need to have a mold movable between a straight position and a tilted position or to have a tilting arm. However, the rotation speed of such a machine would have to be reduced in order to limit the risks of spilling due to the centrifugal force imparted on the processed container.

Another variant of the machine 100 is provided with first axes F of the first stations 4 forming an angle with the main axis A, and moving along a first conical surface and/or with second axes C of the second stations 6 forming the same or another angle with the main axis A and moving along a second conical surface. The gripper element 144 may advantageously be driven by a robot arm having six degrees of liberty in order to catch the container already processed with the first process from the first conical surface and the deliver it along the second conical surface.

The rotary machine 1 and or 100 are particularly satisfactory in terms of space requirement, throughput and risks of spilling by having first and second stations very close from each other, by making them rotate around the same single main axis A and by dedicating all the first stations to the first process and all the second stations to the second process.

The invention claimed is:

1. A rotary machine for forming preforms into containers, the machine comprising:
   a wheel unit configured for rotation about a main axis,
   a first number of first stations coupled to liquid feeders and configured to apply a first process injecting a liquid medium into the preforms and resulting in forming of the containers, each first station supported by the wheel unit and being rotatable around the main axis,
   a second number of second stations configured to apply a second process to the containers, the second number being different than the first number, each second station supported by the wheel unit and being rotatable around the main axis,
   an internal exit position at which each first station is configured to release the formed container,
   an internal entry position at which each second station is configured to receive a formed container from a first station and to start applying the second process to the formed container, and
   at least one transfer arm comprising a gripper element configured to seize a formed container, the transfer arm configured to move the gripper element between one of the first stations located at the internal exit position and one of the second stations located at the internal entry position.

2. The rotary machine according to claim 1, wherein the rotary machine includes an external entry position, a feeding device located adjacent to the external entry position and configured to feed one of the preforms into one of the first stations at the external entry position, and wherein each of the liquid feeders further includes a filling device that is extendable along a first station axis.

3. The rotary machine according to claim 2, wherein the first station axis is angled with respect to the main axis when the first station is at the internal exit position.

4. The rotary machine according to claim 1, wherein each of the first stations comprises:
   a mold defining a mold cavity having the shape of the formed container to be obtained at the end of the first process, the mold configured to receive one of the preforms at an external entry position of the rotary machine and to release the formed container at the internal exit position of the rotary machine, and
   each of the liquid feeder comprises a filling device configured to connect in a liquid tight manner to a neck of the preform received by the mold, the filling device further configured to inject a liquid into the preform received by the mold and to shape and fill the preform into the formed container.

5. The rotary machine according to claim 4, wherein the mold and the filling device extend along a first station axis that is angled with respect to the main axis at the internal exit position, whereby liquid is prevented from being spilled out of the container once the filling device is disconnected from the neck of the formed container.

6. The rotary machine according to claim 4, wherein the preforms extend along an axis substantially parallel to the main axis at the external entry position of the rotary machine and wherein the machine further comprises a tilting arm configured to move one of the preforms to the mold of a first station located at the external entry position of the machine, the tilting arm being configured to align the axis of the preform with the first station axis of the mold and to place the preform in the mold.

7. The rotary machine according to claim 1, wherein the liquid feeders each include an injection device coupled to a source of liquid and configured to inject the liquid into the preform.

8. A rotary machine for processing a preform into a container, the machine comprising:

a wheel unit configured for rotation about a main axis;
a plurality of first stations configured to apply a first process to the preform resulting in the container, each first station supported by the wheel unit and being rotatable around the main axis, the first stations each including a mold defining a mold cavity having the shape of the container to be obtained at the end of the first process, the mold configured to receive one of the preforms at an external entry position of the rotary machine and to release the container at an internal exit position of the rotary machine, the preforms oriented along an axis substantially parallel to the main axis at the external entry position, each mold being movably mounted for movement between a straight position where a mold axis extends parallel to the main axis and an angled position where the mold axis extends along a first station axis that is angled with respect to the main axis, the mold being in the straight position at the external entry position and being movable to the angled tilted position at the start of the first process, each first station also including a filling device configured to connect in a liquid tight manner to a neck of the preform received by the mold and to inject a liquid into the preform to shape and fill the preform into the container;
the internal exit position at which each first station is configured to release the processed container, each filling device and each mold extending along the first station axis at the internal exit position whereby liquid is prevented from being spilled out of the container once the filling device is disconnected from the neck of the container;
a plurality of second stations configured to apply a second process to the container, each second station supported by the wheel unit and being rotatable around the main axis;
an internal entry position at which each second station is configured to receive a container from one of the first stations and to start applying the second process to the container;
at least one transfer arm including a gripper element configured to seize a container, the transfer arm being configured to move the gripper element between one of the first stations located at the internal exit position and one of the second stations located at the internal entry position.

9. A rotary machine for processing a container comprising:
a wheel unit configured for rotation about a main axis,
a plurality of first stations configured to apply a first process to a container resulting in a processed container, each first station supported by the wheel unit and being rotatable around the main axis,
a plurality of second stations configured to apply a second process to a processed container, each second station supported by the wheel and being rotatable around the main axis,
an internal exit position at which each first station is configured to release the processed container,
an internal entry position at which each second station is configured to receive a processed container from a first station and to start applying the second process to the processed container,
at least one transfer arm comprising a gripper element configured to seize a processed container, the transfer arm configured to move the gripper element between one of the first stations located at the internal exit position and one of the second stations located at the internal entry position,
wherein each second station comprises a container seat configured to hold a processed container and a capping device configured to apply a cap on the processed container held by the container seat, the container seat comprising an opening for receiving the processed container.

10. The rotary machine according to claim 9, wherein the container seat and the capping device extend along a second station axis that is parallel to a first station axis, such that the processed container extends along the second station axis when said second station is located at the internal entry position.

11. The rotary machine according to claim 10, wherein the gripper element is configured to maintain the processed container aligned on an axis parallel to the first station axis and to the second station axis between the internal exit position and the internal entry position, and wherein the rotary machine further comprises an external exit position at which each of the second stations is configured to release the capped container.

12. The rotary machine for processing a container comprising:
a wheel unit configured for rotation about a main axis,
a plurality of first stations configured to apply a first process to a container resulting in a processed container, each first station supported by the wheel unit and being rotatable around the main axis,
a plurality of second stations configured to apply a second process to a processed container, each second station supported by the wheel and being rotatable around the main axis,
an internal exit position at which each first station is configured to release the processed container,
an internal entry position at which each second station is configured to receive a processed container from a first station and to start applying the second process to the processed container,
at least one transfer arm comprising a gripper element configured to seize a processed container, the transfer arm configured to move the gripper element between one of the first stations located at the internal exit position and one of the second stations located at the internal entry position, and
wherein the internal exit position and the internal entry position are offset relative to each other about the main axis, the transfer arm being movable in translation according to an axis parallel to the main axis and/or wherein the internal exit position and the internal entry position are offset relative to each other according to a radial axis substantially perpendicular to the main axis, the transfer arm being movable in translation according to an axis parallel to the radial axis.

13. The rotary machine according to claim 12, wherein the internal exit position and the internal entry position are angularly offset relative to each other, the transfer arm being movable in rotation around a transfer axis parallel to and remote from the main axis.

14. A rotary machine for processing a preform into a container, the rotary machine comprising:
a wheel unit configured for rotation about a main axis, the wheel unit including a first main wheel and a second main wheel, the first main wheel being configured to rotate around the main axis at a first rotation speed (W1) and the second main wheel being configured to rotate around the main axis at a second rotation speed (W2);

a plurality of first stations supported by the first main wheel and being rotatable about the main axis, the plurality of first stations being a first number (N1) and each of the first stations configured to apply a first process to the preforms resulting in forming of the containers;

a plurality of second stations supported by the second main wheel and being rotatable about the main axis, the plurality of second stations being a second number (N2), the second number (N2) being different from the first number (N), the second stations configured to apply a second process to a containers, each second station supported by the wheel unit and being rotatable around the main axis, wherein the first rotational speed (W1) and the second rotational speed (W2) are such that W2/W1 equals N1/N2;

an internal exit position at which each first station is configured to release the processed container;

an internal entry position at which each second station is configured to receive a processed container from a first station and to start applying the second process to the processed container; and at least one transfer arm comprising a gripper element configured to seize a processed container, the transfer arm configured to move the gripper element between one of the first stations located at the internal exit position and one of the second stations located at the internal entry position.

15. The rotary machine according to claim 14, wherein the machine includes a single transfer arm configured to move the processed container from one of the first stations at the internal exit position on the first main wheel to one of the second stations at the internal entry position on the second main wheel.

* * * * *